(12) United States Patent
Kobayashi et al.

(10) Patent No.: US 11,229,889 B2
(45) Date of Patent: Jan. 25, 2022

(54) EXTRUDER SCREW WITH ALTERNATELY-ARRANGED CONVEYANCE PORTIONS AND EXTRUDERS AND EXTRUSION METHODS USING THE EXTRUDER SCREW

(71) Applicant: Toshiba Kikai Kabushiki Kaisha, Tokyo (JP)

(72) Inventors: Akiyoshi Kobayashi, Fuji (JP); Shigeyuki Fujii, Numazu (JP); Takafumi Sameshima, Mishima (JP)

(73) Assignee: Shibaura Machine Co., Ltd., Tokyo (JP)

( * ) Notice: Subject to any disclaimer, the term of this patent is extended or adjusted under 35 U.S.C. 154(b) by 825 days.

(21) Appl. No.: 15/795,534

(22) Filed: Oct. 27, 2017

(65) Prior Publication Data
US 2018/0093233 A1     Apr. 5, 2018

Related U.S. Application Data

(63) Continuation of application No. PCT/JP2016/062278, filed on Apr. 18, 2016.

(30) Foreign Application Priority Data

Apr. 28, 2015   (JP) ............................. JP2015-091318

(51) Int. Cl.
*B29B 7/42*     (2006.01)
*B29B 7/82*     (2006.01)
(Continued)

(52) U.S. Cl.
CPC .......... *B01F 7/00416* (2013.01); *B01F 15/06* (2013.01); *B29B 7/42* (2013.01);
(Continued)

(58) Field of Classification Search
CPC ........... B29B 7/489; B29B 7/847; B29B 7/82; B29B 7/90; B29B 7/845; B29B 7/42;
(Continued)

(56) References Cited

U.S. PATENT DOCUMENTS

| 3,305,894 A | 2/1967 | Gerhard et al. |
| 3,371,379 A * | 3/1968 | Reifenhauser ........ B29C 48/766 |
| | | 96/196 |

(Continued)

FOREIGN PATENT DOCUMENTS

| CN | 87102748 | 11/1987 |
| CN | 1382573 | 12/2002 |

(Continued)

OTHER PUBLICATIONS

German Office Action in DE Application No. 11 2015 002 161.2 dated Aug. 8, 2019.
(Continued)

*Primary Examiner* — Charles Cooley
(74) *Attorney, Agent, or Firm* — DLA Piper LLP US

(57) ABSTRACT

A conveyance portion, a barrier portion, and a path are provided at places of a screw main body in which a kneading portion is provided. In at least one of the places, the path is provided inside the screw main body, and includes an entrance and an exit. The entrance is opened to urge the raw materials having the conveyance limited by the barrier portion to increase pressure on the raw materials, to flow in the entrance. The raw materials flowing from the entrance flow through the path in the same direction as a conveyance direction of the conveyance portion.

18 Claims, 13 Drawing Sheets

(51) Int. Cl.
- *B29C 48/74* (2019.01)
- *B29C 48/25* (2019.01)
- *B29C 48/505* (2019.01)
- *B29B 7/48* (2006.01)
- *B29C 48/53* (2019.01)
- *B29C 48/575* (2019.01)
- *B29C 48/57* (2019.01)
- *B29C 48/51* (2019.01)
- *B29C 48/67* (2019.01)
- *B29K 101/12* (2006.01)
- *B29K 105/00* (2006.01)
- *B01F 7/00* (2006.01)
- *B01F 15/06* (2006.01)

(52) U.S. Cl.
CPC ............ *B29B 7/421* (2013.01); *B29B 7/429* (2013.01); *B29B 7/483* (2013.01); *B29B 7/489* (2013.01); *B29B 7/823* (2013.01); *B29C 48/2564* (2019.02); *B29C 48/25682* (2019.02); *B29C 48/268* (2019.02); *B29C 48/507* (2019.02); *B29C 48/51* (2019.02); *B29C 48/53* (2019.02); *B29C 48/57* (2019.02); *B29C 48/575* (2019.02); *B29C 48/745* (2019.02); *B01F 2015/061* (2013.01); *B01F 2215/0049* (2013.01); *B29C 48/67* (2019.02); *B29K 2101/12* (2013.01); *B29K 2105/251* (2013.01)

(58) Field of Classification Search
CPC ....... B29B 7/421; B29B 7/823; B29B 7/7485; B29B 7/7461; B29B 7/429; B29B 7/482; B29B 7/422; B29B 7/726; B29B 7/483; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29C 48/2564; B29C 48/507; B29C 48/53; B29C 48/575; B29C 48/57; B29C 48/25682; B29C 48/268; B29C 48/67; B29K 2105/251; B29K 2023/12; B29K 2509/00; B29K 2101/12; B01F 7/00416; B01F 15/06; B01F 2015/061; B01F 2215/0049
USPC ............................ 425/200–209; 366/79–91
See application file for complete search history.

(56) References Cited

U.S. PATENT DOCUMENTS

| | | | | |
|---|---|---|---|---|
| 3,503,944 A * | 3/1970 | Mohr | ............ | B29C 48/72 526/88 |
| 3,712,594 A * | 1/1973 | Schippers | ............ | B29C 48/505 366/75 |
| 3,746,318 A * | 7/1973 | Schippers | ............ | B29B 7/42 366/79 |
| 3,799,234 A | 3/1974 | Skidmore | | |
| 3,924,842 A * | 12/1975 | Klein | ............ | B29C 48/395 366/79 |
| 3,963,558 A | 6/1976 | Skidmore | | |
| 3,999,921 A * | 12/1976 | Thor | ............ | B29B 7/42 425/208 |
| 4,169,679 A | 10/1979 | Miller et al. | | |
| 4,290,702 A * | 9/1981 | Klein | ............ | B29C 45/50 366/77 |
| 4,302,409 A | 11/1981 | Miller et al. | | |
| 4,329,313 A | 5/1982 | Miller et al. | | |
| 4,387,997 A * | 6/1983 | Klein | ............ | B29C 45/50 366/79 |
| 4,423,960 A * | 1/1984 | Anders | ............ | B29C 48/395 366/75 |
| 4,472,059 A * | 9/1984 | Klein | ............ | B29C 48/51 366/79 |
| 4,637,790 A * | 1/1987 | Klein | ............ | B29C 48/51 425/208 |
| 4,802,140 A * | 1/1989 | Dowling | ............ | B29B 7/42 366/79 |
| 4,902,455 A | 2/1990 | Wobbe | | |
| 4,959,186 A | 9/1990 | Dollhopf | | |
| 4,983,114 A | 1/1991 | Hauck | | |
| 5,102,594 A | 4/1992 | Burlet et al. | | |
| 5,358,681 A | 10/1994 | Jerman et al. | | |
| 5,499,870 A | 3/1996 | Rockstedt | | |
| 5,804,111 A * | 9/1998 | Kobayashi | ............ | B29C 48/38 264/40.5 |
| 6,024,479 A | 2/2000 | Haring | | |
| 8,048,948 B2 | 11/2011 | Shimizu et al. | | |
| 8,975,336 B2 | 3/2015 | Shimizu et al. | | |
| 9,199,393 B2 * | 12/2015 | Shimizu | ............ | B29B 7/728 |
| 10,967,554 B2 * | 4/2021 | Kobayashi | ............ | B29C 48/51 |
| 11,072,104 B2 * | 7/2021 | Kobayashi | ............ | B29C 48/51 |
| 2002/0186612 A1 | 12/2002 | Murakami et al. | | |
| 2004/0222543 A1 | 11/2004 | Innerebner et al. | | |
| 2004/0238990 A1 | 12/2004 | Hermann et al. | | |
| 2005/0087904 A1 | 4/2005 | Bryan | | |
| 2006/0108706 A1 | 5/2006 | Galimberti | | |
| 2016/0303766 A1 | 6/2016 | Kobayashi | | |
| 2016/0332331 A1 * | 11/2016 | Kobayashi | ............ | B29B 7/483 |
| 2016/0332332 A1 * | 11/2016 | Kobayashi | ............ | B29C 48/54 |
| 2017/0021547 A1 * | 1/2017 | Kobayashi | ............ | B29B 7/82 |
| 2017/0050366 A1 * | 2/2017 | Kobayashi | ............ | B29B 7/82 |
| 2017/0050367 A1 * | 2/2017 | Kobayashi | ............ | B29C 48/67 |
| 2017/0113394 A1 * | 4/2017 | Kobayashi | ............ | B29B 7/429 |
| 2017/0225360 A1 * | 8/2017 | Kobayashi | ............ | B29B 7/823 |
| 2017/0225379 A1 * | 8/2017 | Kobayashi | ............ | B29B 7/487 |
| 2018/0093233 A1 * | 4/2018 | Kobayashi | ............ | B01F 15/06 |
| 2018/0093234 A1 * | 4/2018 | Kobayashi | ............ | B29B 7/421 |
| 2019/0352472 A1 * | 11/2019 | Sameshima | ............ | B29C 48/16 |
| 2020/0282622 A1 | 9/2020 | Ougier | | |
| 2021/0154906 A1 * | 5/2021 | Kobayashi | ............ | B29C 48/51 |

FOREIGN PATENT DOCUMENTS

| | | |
|---|---|---|
| CN | 101973121 | 2/2011 |
| CN | 103068540 | 4/2013 |
| DE | 2040919 A | 2/1972 |
| DE | 2454785 * | 5/1976 |
| DE | 2454785 A | 5/1976 |
| DE | 25 48 490 | 5/1977 |
| DE | 694 17 466 | 12/1999 |
| EP | 0 688 600 | 12/1995 |
| EP | 2 578 378 | 4/2013 |
| EP | 3650196 A1 * | 5/2020 |
| GB | 1175127 | 12/1969 |
| GB | 1 501 412 | 2/1978 |
| JP | 48-61153 | 8/1973 |
| JP | 50-143863 | 11/1975 |
| JP | 52-72573 | 5/1977 |
| JP | S52-72573 | 5/1977 |
| JP | 56-037054 | 8/1981 |
| JP | S57-034936 | 2/1982 |
| JP | 57-041932 | 3/1982 |
| JP | 57-107826 | 7/1982 |
| JP | S57-163547 | 10/1982 |
| JP | 58-025943 | 2/1983 |
| JP | 59-184635 | 10/1984 |
| JP | H01-320129 | 12/1989 |
| JP | 5-220818 | 8/1993 |
| JP | H06-170920 | 6/1994 |
| JP | 07-088923 | 4/1995 |
| JP | 7-227836 | 8/1995 |
| JP | H09-504755 | 5/1997 |
| JP | 2002-321214 | 11/2002 |
| JP | 2004-529018 | 9/2004 |
| JP | 2005-169764 | 6/2005 |

(56) References Cited

FOREIGN PATENT DOCUMENTS

| | | | | |
|---|---|---|---|---|
| JP | 2005-313608 | 11/2005 | | |
| JP | 2008-302555 | 12/2008 | | |
| JP | 2009-045804 | 3/2009 | | |
| JP | 2010-069771 | 4/2010 | | |
| JP | 2010-105285 | 5/2010 | | |
| JP | 2010-137405 | 6/2010 | | |
| JP | 2011-020341 | 2/2011 | | |
| JP | 2011-046104 | 3/2011 | | |
| JP | 2011-083976 | 4/2011 | | |
| JP | 2011-116025 | 6/2011 | | |
| JP | 2012-051289 | 3/2012 | | |
| JP | 2013-071428 | 4/2013 | | |
| JP | 2013-123841 | 6/2013 | | |
| JP | 53-69614 | 12/2013 | | |
| JP | 2014-019045 | 2/2014 | | |
| KR | 2002-0082788 | 10/2002 | | |
| KR | 10-0401578 | 8/2004 | | |
| KR | 10-2010-0087738 | 8/2010 | | |
| SU | 889462 A2 * | 12/1981 | | B29C 48/51 |
| WO | WO 2010/061872 | 6/2010 | | |
| WO | WO 2012/029271 | 3/2012 | | |
| WO | WO 2013/133453 | 9/2013 | | |
| WO | WO-2013133453 A1 * | 9/2013 | | B29C 48/64 |
| WO | WO 2015/163197 | 10/2015 | | |
| WO | WO 2015/170617 | 11/2015 | | |
| WO | WO-2020025446 A1 * | 2/2020 | | B33Y 40/10 |

OTHER PUBLICATIONS

International Search Report (with English Translation) issued in PCT/JP2015/061874 dated Jul. 7, 2015.
Written Opinion (with English Translation) issued in PCT/JP2015/061874 dated Jul. 7, 2015.
International Preliminary Report on Patentability issued in PCT/JP2015/061874 dated Nov. 8, 2016.
International Search Report (with English Translation) issued in PCT/JP2015/062549 dated Jul. 21, 2015.
Written Opinion (with English Translation) issued in PCT/JP2015/062549 dated Jul. 21, 2015.
International Preliminary Report on Patentability issued in PCT/JP2015/062549 dated Nov. 8, 2016.
International Search Report (with English Translation) issued in PCT/JP2015/062566 dated Jul. 21, 2015.
Written Opinion (with English Translation) issued in PCT/JP2015/062566 dated Jul. 21, 2015.
International Preliminary Report on Patentability issued in PCT/JP2015/062566 dated Nov. 8, 2016.
Taiwanese Office Action (with English Translation) issued in TW 104114405 dated Jun. 16, 2016.
Taiwanese Office Action (with English Translation) issued in TW 104114406 dated Jun. 16, 2016.
Chinese Office Action (with English Translation) issued in CN 2015-80005725.2 dated Apr. 24, 2017.
Korean Office Action issued in KR 10-2016-7019779 dated Nov. 27, 2017.
Chinese Office Action issued in CN 2015-80023951.3 dated Mar. 30, 2018.
Chinese Office Action issued in CN 2015-80024101.5 dated Apr. 2, 2018.
Xiaozheng, Geng "Plastics Mixing & Continuous Mixing Equipment", China Light Industry Press, pp. 349-353, Jan. 31, 2008.
Korean Office Action issued in KR 2016-7033989 dated Jul. 16, 2018.
Korean Office Action issued in KR 2016-7033993 dated Aug. 2, 2018.
Japanese Office Action issued in JP Application No. 2015-082775 dated May 7, 2019.
International Search Report issued in International Application No. PCT/JP2015/060641 dated May 26, 2015.
International Search Report issued in International Application No. PCT/JP2015/061487 dated Jul. 7, 2015.
International Search Report issued in International Application No. PCT/JP2016/062278 dated Jul. 12, 2016.
International Search Report issued in International Application No. PCT/JP2016/062279 dated Jul. 12, 2016.
Written Opinion issued in International Application No. PCT/JP2015/060641 dated May 26, 2015.
Written Opinion issued in International Application No. PCT/JP2015/061487 dated Jul. 7, 2015.
Written Opinion issued in International Application No. PCT/JP2016/062278 dated Jul. 12, 2016.
Written Opinion issued in International Application No. PCT/JP2016/062279 dated Jul. 12, 2016.
Taiwan Office Action issued in Taiwan Application No. 104112230 dated Sep. 2, 2016.
Taiwan Office Action issued in Taiwan Application No. 104112709 dated Sep. 2, 2016.
Chinese Office Action issued in Chinese Application No. 201580007088.2 dated Mar. 3, 2017.
Chinese Office Action issued in Chinese Application No. 201580007825.9 dated Mar. 24, 2017.
Korean Office Action issued in KR 10-2016-7021148 dated Nov. 29, 2017.
English Language Abstract of JP 7-227836 published Aug. 29, 1995.
English Language Abstract of JP 2010-137405 published Jun. 24, 2010.
English Language Abstract of JP 2013-123841 published Jun. 24, 2013.
English Language Abstract of JP 57-041932 published Mar. 9, 1982.
English Language Abstract of KR 10-2010-0087738 published Aug. 5, 2010.
Office Action in DE Application No. 112015001938.3 dated Jul. 26, 2019.
Office Action in CN Application No. 201680024052X dated Jul. 22, 2019.
German Office Action in DE Application No. 11 2015 002 164.7, dated Jun. 23, 2020.
U.S. Appl. No. 15/221,277.
U.S. Appl. No. 15/345,750.
U.S. Appl. No. 15/221,293.
U.S. Appl. No. 15/795,535.
U.S. Appl. No. 15/345,711, filed Nov. 8, 2015.
U.S. Appl. No. 15/221,293, filed Jul. 27, 2016.
U.S. Appl. No. 15/221,277, filed Jul. 27, 2016.
U.S. Appl. No. 15/345,750, filed Nov. 8, 2016.
U.S. Appl. No. 15/795,535, filed Oct. 27, 2017.
U.S. Appl. No. 15/345,758, filed Nov. 8, 2016.
U.S. Appl. No. 17/166,781, filed Feb. 3, 2021.
U.S. Appl. No. 15/221,293, 2016-0332332 A1, filed Jul. 27, 2016, Pending.
U.S. Appl. No. 15/221,277, 2016-0332331 A1, filed Jul. 27, 2016, Pending.
U.S. Appl. No. 15/345,750, 2017-0113394 A1, filed Nov. 8, 2016, Pending.
U.S. Appl. No. 15/345,711, 2017-0050366 A1, filed Nov. 8, 2016, Pending.
U.S. Appl. No. 15/345,758, 2017-0050367 A1, filed Nov. 8, 2016, Pending.
U.S. Appl. No. 15/795,535, 2018-0093234 A1, filed Oct. 27, 2017, Pending.
U.S. Appl. No. 17/166,781, filed Feb. 3, 2021, Pending.
U.S. Appl. No. 15/345,711.
U.S. Appl. No. 15/345,758.
U.S. Appl. No. 17/386,635.
U.S. Appl. No. 15/345,711, 2017-0050367 A1, filed Nov. 8, 2016, Pending.
U.S. Appl. No. 17/386,635, filed Jul. 28, 2021, Pending.
U.S. Appl. No. 15/221,293 dated Dec. 7, 2021 (Sep. 7, 2021 to present).
U.S. Appl. No. 15/221,277 dated Dec. 7, 2021 (Sep. 7, 2021 to present).

(56) References Cited

OTHER PUBLICATIONS

U.S. Appl. No. 15/345,711 dated Dec. 7, 2021 (Sep. 7, 2021 to present).
U.S. Appl. No. 15/795,535 dated Dec. 7, 2021 (Sep. 7, 2021 to present).

* cited by examiner

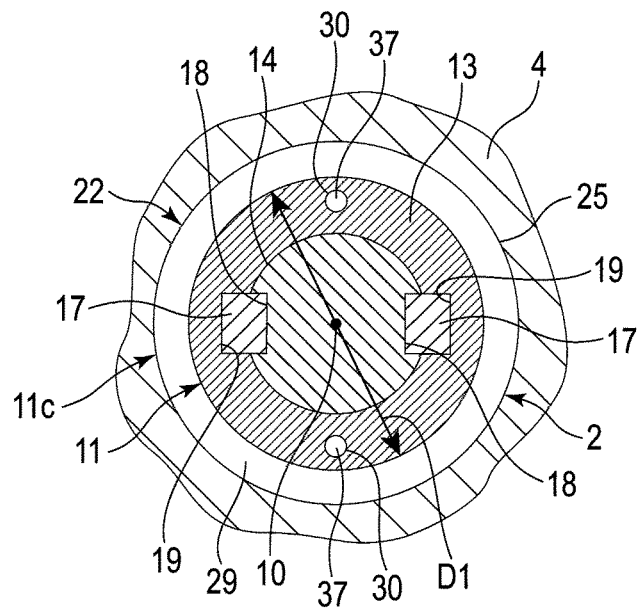
F I G. 3
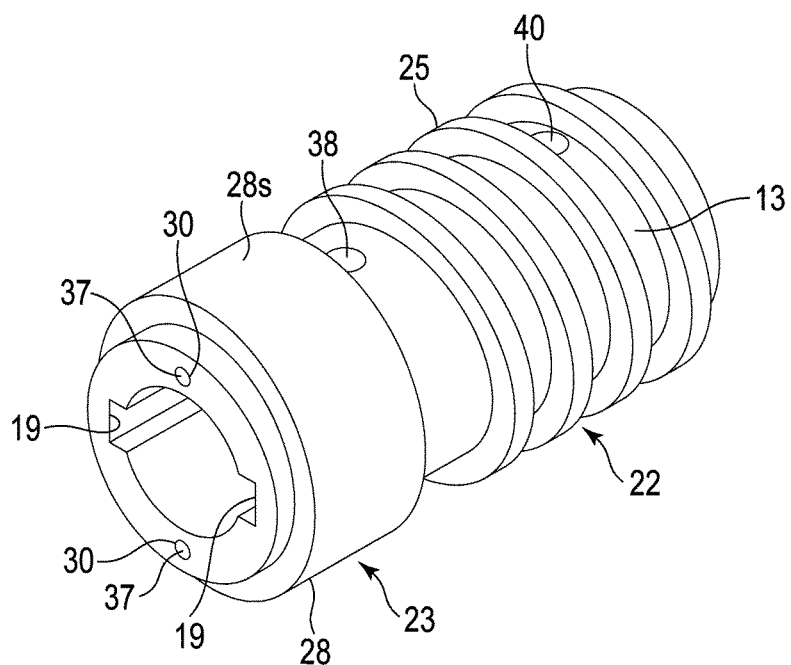
F I G. 4

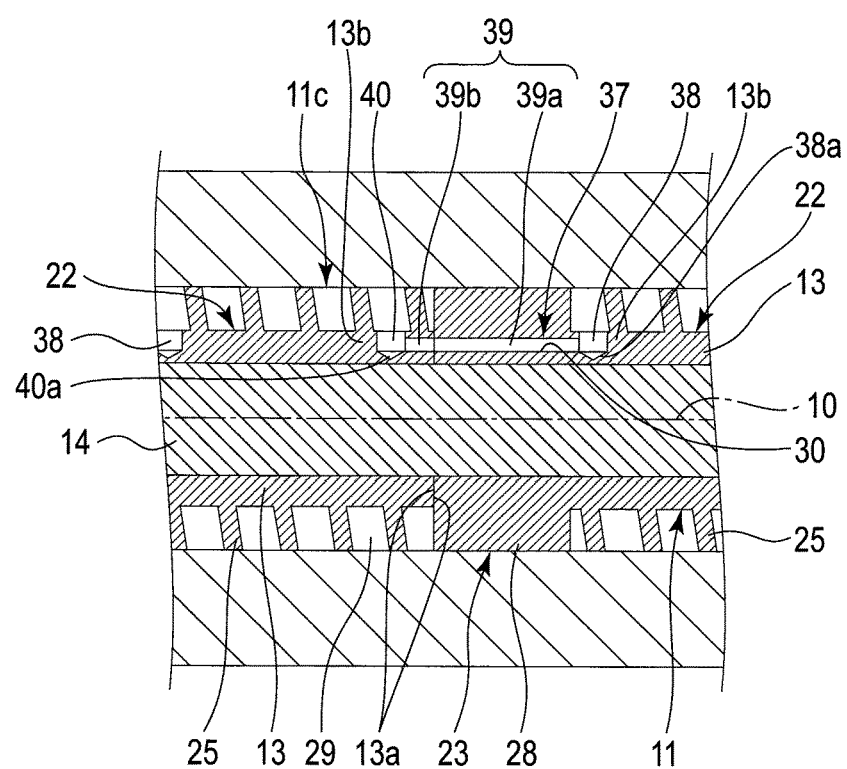
F I G. 5

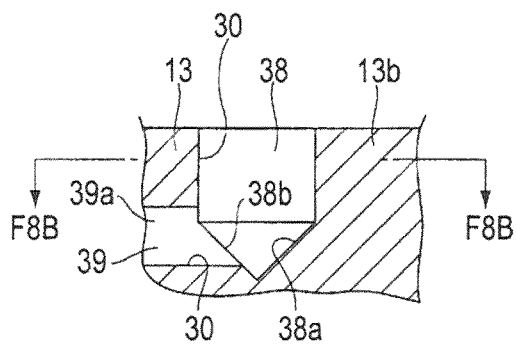 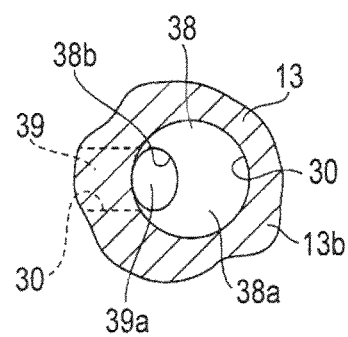
FIG. 8(A)   FIG. 8(B)
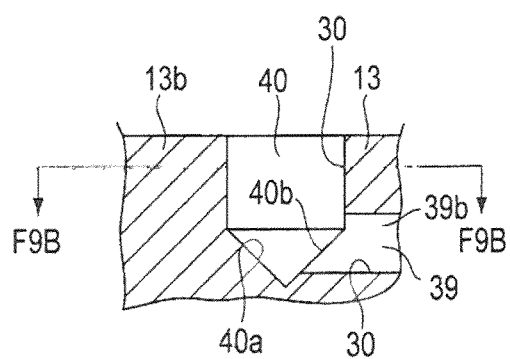 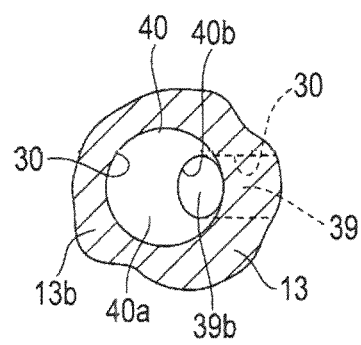
FIG. 9(A)   FIG. 9(B)

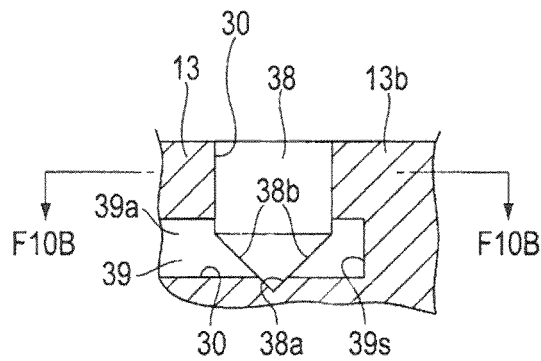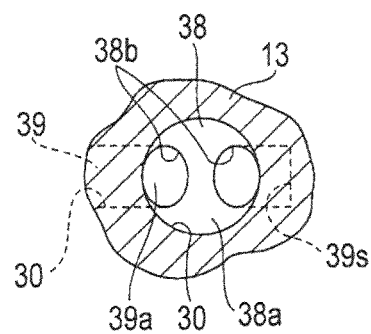
FIG. 10(A)        FIG. 10(B)
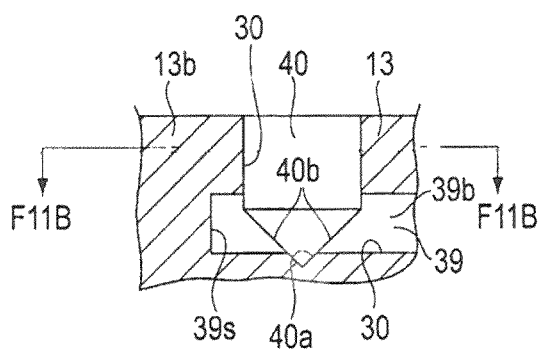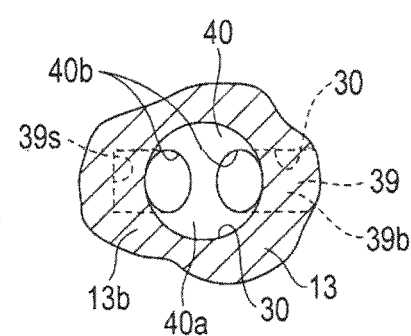
FIG. 11(A)        FIG. 11(B)

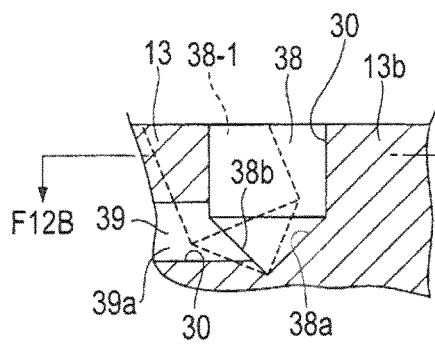 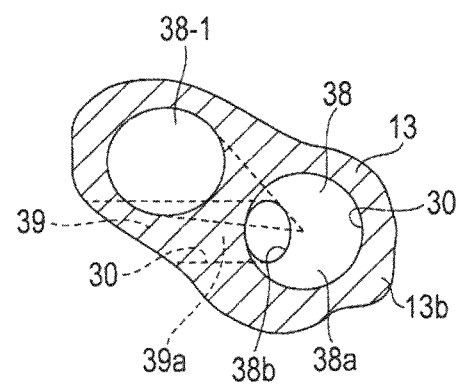
FIG. 12(A)　　　　FIG. 12(B)
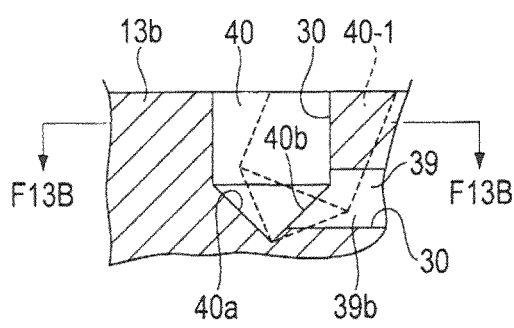 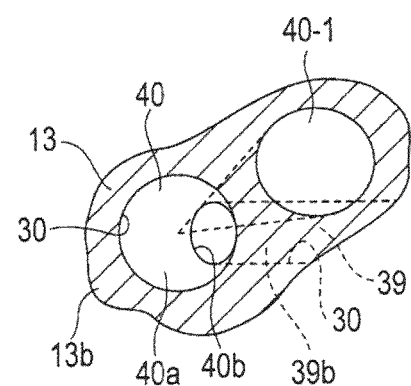
FIG. 13(A)　　　　FIG. 13(B)

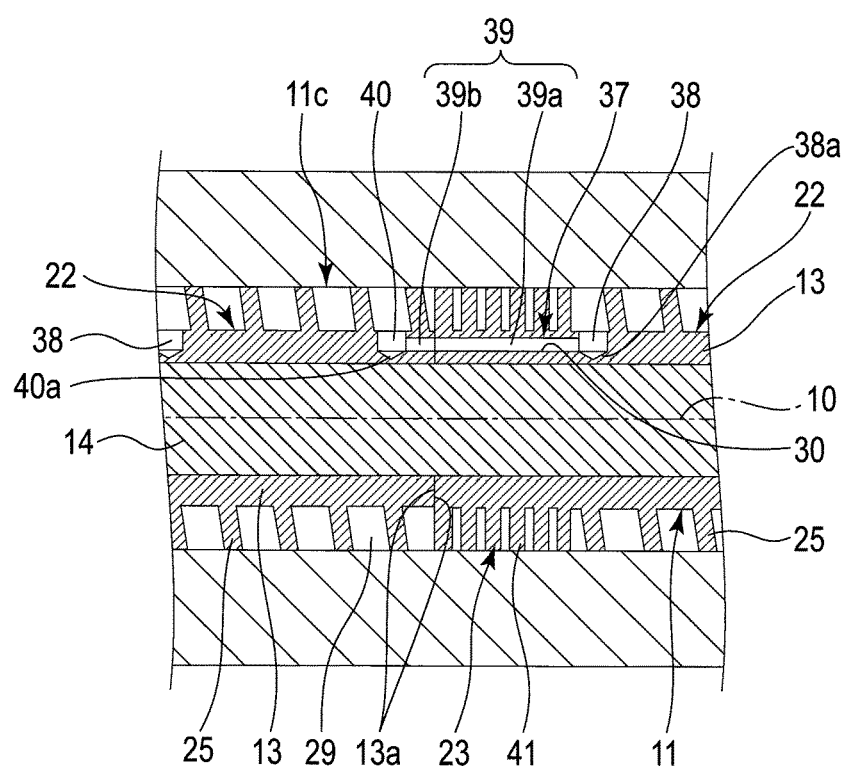
F I G. 19

EXTRUDER SCREW WITH ALTERNATELY-ARRANGED CONVEYANCE PORTIONS AND EXTRUDERS AND EXTRUSION METHODS USING THE EXTRUDER SCREW

CROSS-REFERENCE TO RELATED APPLICATIONS

This application is a Continuation Application of PCT Application No. PCT/JP2016/062278, filed Apr. 18, 2016 and based upon and claiming the benefit of priority from prior Japanese Patent Application No. 2015-091318, filed Apr. 28, 2015, the entire contents of all of which are incorporated herein by reference.

BACKGROUND OF THE INVENTION

1. Field of the Invention

The present invention relates to an extrusion technique capable of improving the degree of kneading without elongating an extruder (screw).

2. Description of the Related Art

Conventionally, an extrusion technique of improving the degree of kneading using "extension action", which is imparted to raw materials when the raw materials pass from a wide place to a narrow place, has been known. For example, Patent Literature 1 and Patent Literature 2 disclose an extrusion technique of additionally providing an extension impartation mechanism which imparts the extension action to the raw materials at a tip of an extruder (screw). Moreover, Patent Literature 3 discloses an extrusion technique of securing an extension impartation region which increases a flow having a high degree of extension between a pair of screws provided with spiral flights.

CITATION LIST

Patent Literature

Patent Literature 1: JP H07-227836 A
Patent Literature 2: JP 2010-137405 A
Patent Literature 3: JP 2013-123841 A

BRIEF SUMMARY OF THE INVENTION

In the extrusion technique disclosed in Patent Literature 1 and Patent Literature 2, however, an entire extruder is elongated by the amount corresponding to the addition of the extension impartation mechanism. In particular, it is disclosed in paragraph [0027] of Patent Literature 2 that the extension action is imparted to the raw materials by making the raw materials pass through a gap between surfaces opposed parallel to each other a plurality of times. Accordingly, further elongation of the entire extruder is inevitable to realize such disclosure.

In addition, in the extrusion technique of Patent Literature 3, the raw materials conveyed by the pair of screws include those flowing along the spiral flights while keeping away from the extension impartation region as well as those passing through the extension impartation region. Accordingly, it is unclear whether all the raw materials conveyed by the pair of screws thoroughly pass through the extension impartation region, in the extrusion technique of Patent Literature 3. In this case, the extension impartation region needs to be secured sufficiently long to thoroughly make all the raw materials pass through the extension impartation region. However, this causes the extruder (screw) to be elongated by the amount corresponding to the elongation of the extension impartation region.

Therefore, an object of the present invention is to provide an extrusion technique of making a screw itself possess a function of imparting an extension action to raw materials, thereby thoroughly imparting the extension action to all the raw materials conveyed by the screw and improving the degree of kneading without elongating an extruder (screw).

To achieve this object, an extruder screw of the present invention comprises a transfer portion continuously conveying a supplied material, a melting and mixing portion continuously melting and mixing the conveyed material, and a kneading portion continuously kneading raw materials obtained by melting and mixing the material. The transfer portion, the melting and mixing portion, and the kneading portion are provided on a screw main body rotating around a linear axis. A conveyance portion conveying the raw materials, a barrier portion restricting conveyance of the raw materials, and a path through which the raw materials flows are provided at places, at a part of the screw main body at which the kneading portion is provided. In at least one of the places, the path is provided inside the screw main body and comprises an entrance and an exit, the entrance is opened in an outer circumferential surface of the screw main body in the conveyance portion to urge the raw materials having the conveyance limited by the barrier portion to increase pressure on the raw materials, to flow into the entrance, the path is configured to urge the raw materials flowing from the entrance to flow toward the exit in a same direction as a direction of the conveyance of the conveyance portion, and the exit is opened in the circumferential surface of the screw main body, at a position displaced from the conveyance portion in which the entrance is opened.

The present invention is an extruder comprising the above-explained extruder screw, comprising a barrel including a cylinder in which the extruder screw is rotatably inserted, a supply port provided on the barrel and configured to supply a material to an inside of the cylinder, and a discharge port which is provided on the barrel and from which a kneaded material generated by the screw is continuously extruded.

The present invention is an extrusion method comprising kneading raw materials by using the above-explained extruder screw, continuously generating the kneaded material, and extruding the kneaded material. While the kneaded material is continuously extruded, the raw materials conveyed along an outer circumferential surface of the screw main body flows through the path and then returns to the outer circumferential surface of the screw, in the kneading portion.

According to the present invention, an extrusion technique of making a screw itself possess the function of imparting the extension action to raw materials, thereby thoroughly imparting the extension action to all the raw materials conveyed by the screw and improving the degree of kneading without elongating an extruder (screw) can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a cross-sectional view seen along line F3-F3 of FIG. 2.

FIG. 4 is an expanded perspective view showing a part of a barrier annular body shown in FIG. 2.

FIG. 5 is an expanded sectional view showing a part of a structure of a path formed to extend across two tubes.

FIG. 8(A) is an expanded sectional view showing a structure of an entrance portion of the path in a modified example of the present invention, and FIG. 8(B) is a cross-sectional view seen along line F8B-F8B of FIG. 8(A).

FIG. 9(A) is an expanded sectional view showing a structure of an exit portion of the path in the modified example of the present invention, and FIG. 9(B) is a cross-sectional view seen along line F9B-F9B of FIG. 9(A).

FIG. 10(A) is an expanded sectional view showing the structure of the entrance portion of the path in the modified example of the present invention, and FIG. 10(B) is a cross-sectional view seen along line F10B-F10B of FIG. 10(A).

FIG. 11(A) is an expanded sectional view showing the structure of the exit portion of the path in the modified example of the present invention, and FIG. 11(B) is a cross-sectional view seen along line F11B-F11B of FIG. 11(A).

FIG. 12(A) is an expanded sectional view showing the structure of the entrance portion of the path in the modified example of the present invention, and FIG. 12(B) is a cross-sectional view seen along line F12B-F12B of FIG. 12(A).

FIG. 13(A) is an expanded sectional view showing the structure of the exit portion of the path in the modified example of the present invention, and FIG. 13(B) is a cross-sectional view seen along line F13B-F13B of FIG. 13(A).

FIG. 19 is an expanded sectional view showing a part of a structure of a barrier portion provided with a flight, in the modified example of the present invention.

DETAILED DESCRIPTION OF THE INVENTION

One of the embodiments of the present invention will be described hereinafter with reference to the accompanying drawings.

Figure 1:
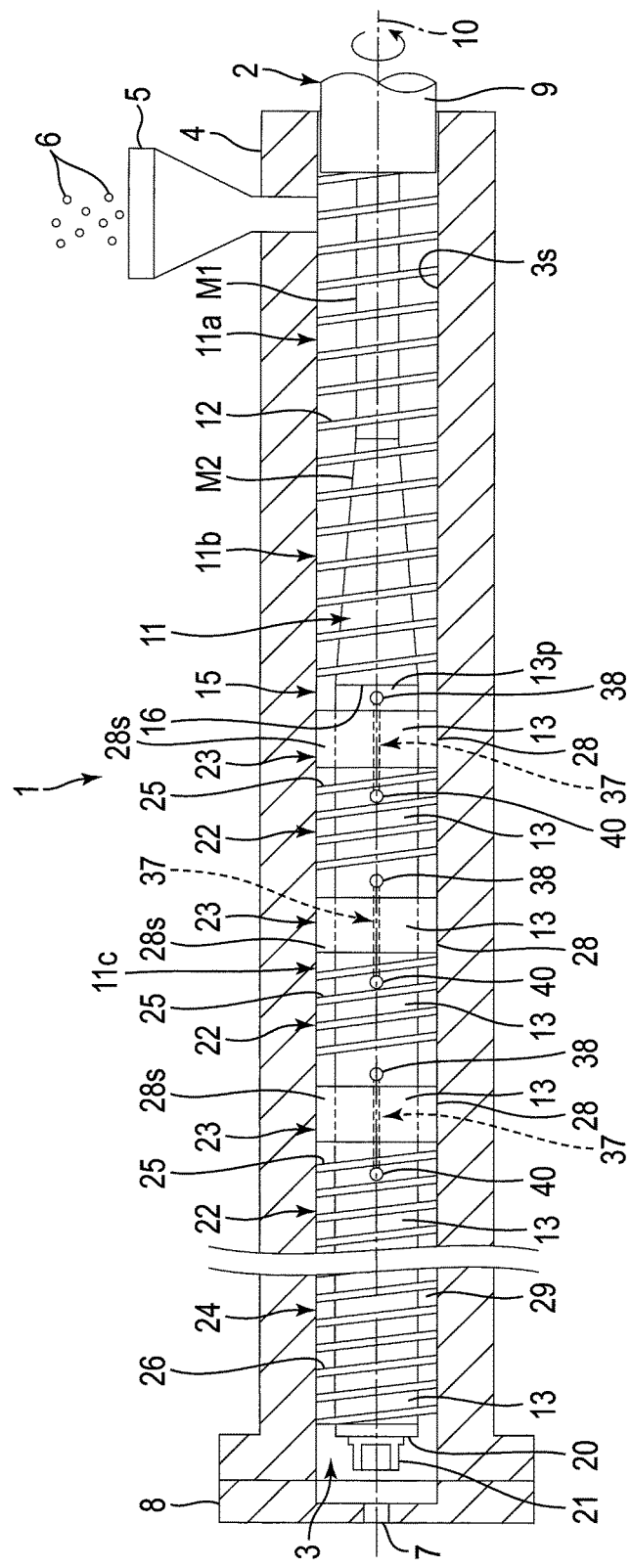
FIG. 1 is a transverse cross-sectional view showing an external structure of an extruder screw in an overall structure of a single screw extruder according to one of embodiments of the present invention.
Figure 2:
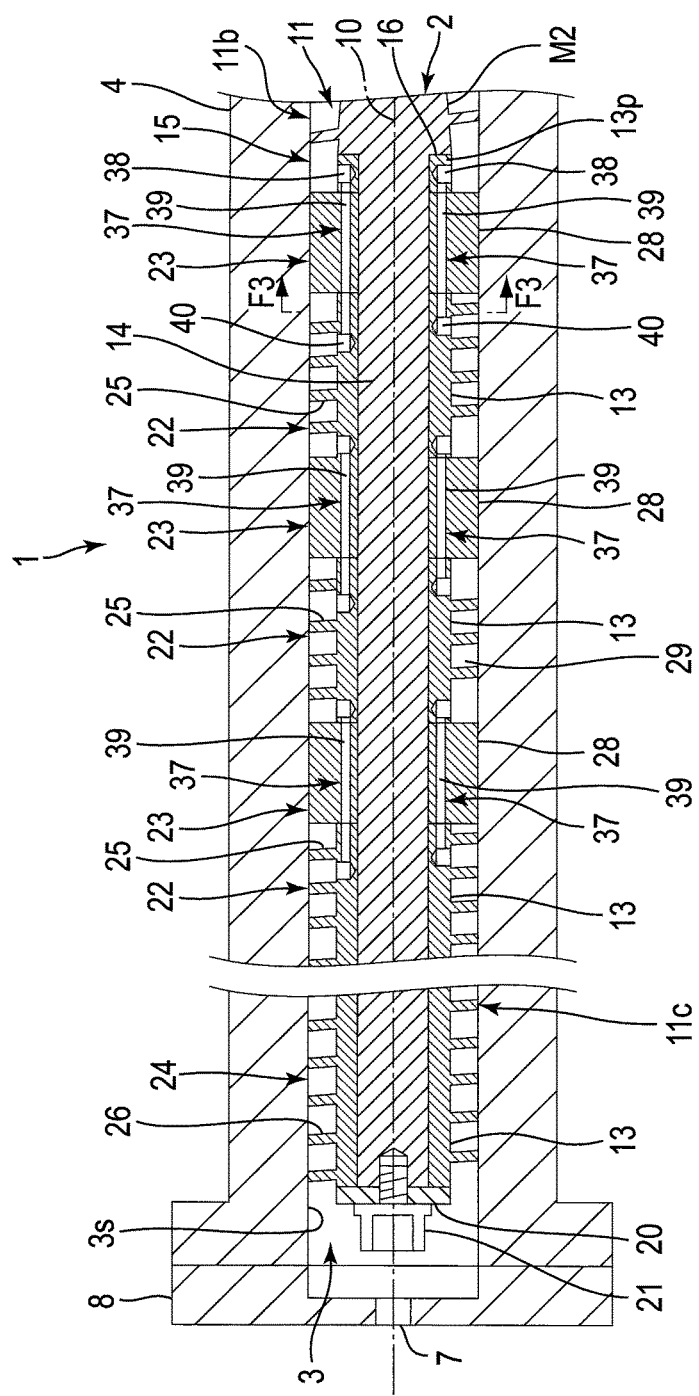
FIG. 2 is a transverse cross-sectional view showing an internal structure of the extruder screw in a kneading portion in the single screw extruder according to the embodiment of the present invention.

FIG. 1 and FIG. 2 show a structure of a single screw extruder 1 according to the present embodiment. The single screw extruder 1 comprises an extruder screw 2 and a barrel 4 comprising a cylinder 3 in which the screw 2 is rotatably inserted.

In one end of the barrel 4, a supply port 5 through which materials 6 such as thermoplastic resin are supplied is provided. The supply port 5 penetrates the barrel 4 to communicate with the cylinder 3. In addition, a discharge port 7 is provided in the other end of the barrel 4. The discharge port 7 is formed in a lid 8 joined to cover the opening in the other end of the barrel 4. Kneaded materials generated by the extruder screw 2 are continuously extruded from the discharge port 7.

Furthermore, the barrel 4 is provided with a coolant path through which cooling water is made to flow, a heater, a temperature sensor, and the like (all not shown). The inside of the cylinder 3 can be heated by controlling the heater to heat the barrel 4 to a set temperature. When the temperature of the barrel 4 exceeds the set temperature, the inside of the cylinder 3 can be cooled to the set temperature by making the cooling water flow through the coolant path and cooling the barrel 4.

The extruder screw 2 extends straight from the base end to the tip and its total length is set to a length corresponding to the total length of the cylinder 3 of the barrel 4. The extruder screw 2 can be thereby arranged to be rotatably inserted in the cylinder 3 of the barrel 4. The base end of the extruder screw 2 is positioned on one end side of the barrel 4 on which the supply port 5 is provided, and a tip of the extruder screw 2 is positioned on the other end side of the barrel 4 on which the discharge port 7 is provided, in a state in which the extruder screw 2 is rotatably inserted in the cylinder 3 of the barrel 4.

A stopper portion 9 is coaxially provided at the base end of the extruder screw 2. The stopper portion 9 is configured to close the opening of the cylinder 3 on the base end side of extruder screw 2 in a state in which the extruder screw 2 is rotatably inserted and disposed in the cylinder 3 of the barrel 4. The materials 6 supplied to the inside of the cylinder 3 can be thereby prevented from leaking to the outside. The stopper portion 9 can be coupled to, for example, a rotating device such as a motor via a coupling not shown. When the torque from the rotating device is transmitted to the stopper portion 9, the extruder screw 2 is rotated around a straight axis 10 extending from its base end to its tip.

Furthermore, the extruder screw 2 comprises a screw main body 11 which rotates integrally with the extruder screw 2. In the following descriptions, a rotational direction (left-handed rotation or right-handed rotation) of the screw main body 11 indicates a rotational direction (left-handed rotation or right-handed rotation) as viewed from the base end side of the screw main body 11, in other words, viewed from the supply port 5 of the barrel 4 in the direction of the discharge port 7. Similarly, a twist direction (clockwise or counterclockwise) of the flights 12, 25, and 26 is the twist direction (clockwise or counterclockwise) of the flights 12, 25, and 26 viewed from the base end side of the screw main body 11.

The screw main body 11 comprises a transfer portion 11a, a melting and mixing portion 11b, and a kneading portion 11c in order from the base end toward the tip of the screw main body 11. The transfer portion 11a continuously conveys the materials 6 supplied from the supply port 5 to the inside of the cylinder 3 toward the melting and mixing portion 11b. The melting and mixing portion 11b continuously melts and mixes the materials 6. Then, materials obtained by melting and mixing each of the materials 6 are continuously introduced to the kneading portion 11c as raw materials for kneading. Desired kneaded materials are continuously generated in the kneading portion 11c.

The part of the screw main body 11 in which the kneading portion 11c is provided is formed by disposing not only portions (shearing action regions) which impart a shearing action to the raw materials, but also, particularly, portions (extension action regions) which impart the extension action to the raw materials at positions in the axial direction. The degree of dispersing the raw materials is thereby improved and, as a result, the kneaded materials excellent in the degree of kneading can be generated. Then, the kneaded materials generated in the cylinder 3 are continuously extruded through the discharge port 7.

A spirally twisted flight 12 is continuously formed on outer circumferential surfaces M1 and M2 of the screw main body 11 extending from the transfer portion 11a to the melting and mixing portion 11b. The flight 12 is configured to continuously convey each of the materials 6 supplied from the supply port 5 to the inside of the cylinder 3 from the transfer portion 11a to the melting and mixing portion 11b. For this reason, the flight 12 is twisted in a direction opposite to the rotational direction of the screw main body 11.

The figures show the flight 12 in a case where each of the materials 6 is conveyed by rotating the screw main body 11 counterclockwise. In this case, the twist direction of the flight 12 is set to the clockwise direction similarly to a right-hand screw. If each of the materials 6 is conveyed by rotating the screw main body 11 clockwise, the twist direction of the flight 12 may be set to the counterclockwise direction similarly to a left-hand screw.

The outer circumferential surface M1 of the screw main body 11 in the transfer portion 11a has a columnar shape, and a gap between the outer circumferential surface M1 and an inner surface 3s of the cylinder 3 is set to be wide. The outer circumferential surface M2 of the screw main body 11 in the melting and mixing portion 11b has a shape widening from the transfer portion 11a toward the kneading portion 11c, and a gap between the outer circumferential surface M2 and an inner surface 3s of the cylinder 3 is set to be continuously narrower from the transfer portion 11a toward the kneading portion 11c.

Each of the materials 6 supplied from the supply port 5 to the cylinder 3 is conveyed from the transfer portion 11a to the melting and mixing portion 11b by the flight 12, in a state in which the extruder screw 2 is rotated counterclockwise. In the melting and mixing portion 11b, each of the materials 6 is subjected to compression mainly from the continuously narrowed gap while heated by the heater, and thereby forms the melted and mixed raw materials for kneading. The raw materials are continuously conveyed from the melting and mixing portion 11b to the kneading portion 11c.

The part of the screw main body 11 in which the kneading portion 11c is provided is composed of cylindrical tubes 13 and one rotary shaft 14 (see FIG. 2) supporting the tubes 13. Furthermore, the kneading portion 11c comprises an introduction portion 15 for introducing the raw materials conveyed from the melting and mixing portion 11b. The introduction portion 15 is formed to be adjacent to an end face 16 of the melting and mixing portion 11b. Details of the introduction portion 15 will be described later.

The rotary shaft 14 is provided in a region extending from the tip of the screw main body 11 to the end face 16 of the melting and mixing portion 11b. The rotary shaft 14 extends straight from the base end to the tip, and the base end is coaxially connected to the end face 16 of the melting and mixing portion 11b. The rotary shaft 14 has a columnar shape, and its contour is set to be smaller than that of the end face 16 of the melting and mixing portion 11b.

As regards a method of connecting the base end of the rotary shaft 14 with the end face 16 of the melting and mixing portion 11b, for example, any one of existing methods such as a method of forming the rotary shaft 14 coaxially and integrally with the screw main body 11 from the transfer portion 11a to the melting and mixing portion 11b and a method of separately forming the screw main body 11 from the transfer portion 11a to the melting and mixing portion 11b and the rotating shaft 14 and then coaxially coupling the base end of the rotary shaft 14 to the end face 16 of the melting and mixing portion 11b may be selected appropriately.

As shown in FIG. 3 and FIG. 4, a pair of keys 17 is provided on an outer circumferential surface of the rotary shaft 14 as an example of a supporting structure urging the rotary shaft 14 to support the tubes 13. The keys 17 are fitted in a pair of groove portions 18 formed at positions displaced from each other by 180° in the circumferential direction along the outer circumferential surface of the rotary shaft 14. Each of the groove portions 18 is formed by partially cutting away the outer circumferential surface of the rotary shaft 14 in the axial direction.

Moreover, each of the tubes 13 is formed to urge the rotary shaft 14 to coaxially penetrate the tube 13 along their inner circumferential surfaces. Keyways 19 are formed at positions displaced from each other by 180° in the circumferential direction, on an inner circumferential surface of each tube 13. The pair of keyways 19 is formed by partially cutting away the inner circumferential surfaces of the tubes 13 in the axial direction.

As shown in FIG. 1 to FIG. 4, the rotating shaft 14 is made to penetrate along the inner circumferential surfaces of all the tubes 13 while the keys 17 and the keyways 19 are aligned with each other. After that, a fixing screw 21 is screwed into the tip of the rotary shaft 14 through a collar 20.

At this time, all the tubes 13 are sandwiched between the tip collar 20 and the end face 16 of the melting and mixing portion 11b, and are held in a state of making close contact with each other without any gaps by the force of sandwiching.

All the tubes 13 are coaxially coupled to each other on the rotary shaft 14 by the above-explained supporting structure, and each of the tubes 13 and the rotary shaft 14 are thereby assembled integrally. The screw main body 11 is formed as a rod-like member extending from the base end to the tip in the axial direction (longitudinal direction) by integrally assembling each of the tubes 13 and the rotary shaft 14.

Thus, each of the tubes 13 can be rotated together with the rotary shaft 14 around the axis 10, i.e., the screw main body 11 can be rotated around the axis 10. Moreover, the base end of the screw main body 11 corresponds to the base end of the rotary shaft 14, and the tip of the screw main body 11 corresponds to the tip of the rotary shaft 14. In other words, the base end of the screw main body 11 corresponds to the base end of the extruder screw 2 corresponding to one end of the barrel 4, and the tip of the screw main body 11 corresponds to the tip of the extruder screw 2 corresponding to the other end of the barrel 4.

At this time, each of the tubes 13 serves as a structural element defining an outer diameter D1 (see FIG. 3) of the screw main body 11, in the portion of the screw main body 11 in which the kneading portion 11c is provided. In the kneading portion 11c, the outer diameters D1 of the tubes 13 coaxially coupled to each other along the rotary shaft 14 are set to be equal to each other. The outer diameter D1 of the screw main body 11 (each tube 13) is defined as a diameter passing through the axis 10 which is a center of rotation of the rotary shaft 14.

A segment type screw 2 in which the outer diameter D1 of the screw main body 11 (each tube 13) in the kneading portion 11c is a fixed value is thereby formed. In the segment type screw 2, screw elements can be held in an arbitrary order and combination along the rotary shaft 14. With respect to the screw elements, for example, each of the tubes 13 on which at least parts of the flights 12, 25, and 26 to be described later are formed can be defined as one screw element.

Convenience in, for example, changes and adjustments in the specifications or service and maintenance, of the screw 2, can be remarkably improved by segmenting the screw 2.

In the present embodiment, the structure in which the tubes 13 and the rotary shaft 14 are fixed and kept from rotating is not limited to the structure associated with the combination of the keys 17 and the keyways 19, but a spline structure (not shown) may be employed instead.

Furthermore, the segment type screw 2 is coaxially accommodated in the cylinder 3 of the barrel 4. More specifically, the screw main body 11 at which the screw elements are held along the rotary shaft 14 is rotatably accommodated in the cylinder 3. In this state, a conveyance path 29 for conveying the raw materials is formed between the outer circumferential surface of the screw main body 11 (tubes 13) and the inner surface 3s of the cylinder 3. The conveyance path 29 has an annular sectional shape in the radial direction of the cylinder 3 and extends in the axial direction along the cylinder 3.

In the present embodiment, the above-explained introduction portion 15, conveyance portions 22 conveying the raw materials introduced by the introduction portion 15, and barrier portions 23 limiting the flow of the raw materials conveyed by the conveyance portions 22 are provided in the part of the screw main body 11 in which the kneading portion 11c is provided. The conveyance portions 42 and the barrier portions 43 are alternately arranged in the axial direction (longitudinal direction) of the screw main body 11 in the kneading portion 11c.

In other words, the barrier portion 23 is arranged on the base end side of the screw main body 11 in the kneading portion 11c. The barrier portion 23 is also used as a constituent element of the introduction portion 15. The conveyance portions 22 and the barrier portions 23 are alternately arranged from this barrier portion 23 toward the tip of the screw main body 11.

On the other hand, a discharge conveyance portion 24 is arranged on the tip side of the screw main body 11 at the kneading portion 11c. The discharge conveyance portion 44 is configured to convey the kneaded materials which are kneaded in the cylinder 21a in the same direction as the conveyance direction of the other conveyance portions 22.

A spirally twisted flight 25 is provided at each of the conveyance portions 22. The flight 25 protrudes from the outer circumferential surface of the tube 13 in the circumferential direction toward the conveyance path 29. The flight 25 is twisted in a direction opposite to the direction of rotation of the screw main body 11 from the base end to the tip of the screw main body 11.

A spirally twisted flight 26 is provided at the discharge conveyance portion 24. The flight 26 protrudes from the outer circumferential surface of the tube 13 in the circumferential direction toward the conveyance path 29. The flight 26 is twisted in a direction opposite to the direction of rotation of the screw main body 11.

When raw materials are kneaded by rotating the screw main body 11 counterclockwise, the flight 25 of each of the conveyance portions 22 is twisted to convey the raw materials from the base end to the tip of the screw main body 11. In other words, the twisting direction of the flight 25 is set to be clockwise similarly to a right-hand screw.

Furthermore, when raw materials are kneaded by rotating the screw main body 11 counterclockwise, the flight 26 of each of the discharge conveyance portion 24 is twisted to convey the raw materials from the base end to the tip of the screw main body 11. In other words, the twisting direction of the flight 26 is set to be clockwise similarly to a right-hand screw.

In contrast, when raw materials are kneaded by rotating the screw main body 11 clockwise, the flight 25 of each of the conveyance portions 22 is twisted to convey the raw materials from the base end to the tip of the screw main body 11. In other words, the twisting direction of the flight 25 is set to be counterclockwise similarly to a left-hand screw.

Furthermore, when raw materials are kneaded by rotating the screw main body 11 clockwise, the flight 26 of each of the discharge conveyance portion 24 is twisted to convey the raw materials from the base end to the tip of the screw main body 11. In other words, the twisting direction of the flight 25 is set to be counterclockwise similarly to a left-hand screw.

A barrier annular body 28 continuous in the circumferential direction along the outer circumferential surface of the screw main body 11 is provided at each of the barrier portions 23. The barrier annular body 28 includes a cylindrical surface 28s coaxially continuous in the circumferential direction around the axis 10 (see FIG. 4). The cylinder surface 28s protrudes from the outer circumferential surface of the tube 13 in the circumferential direction toward the conveyance path 29.

In this case, a gap 27 (see FIG. 7) between an outer diameter portion 23s of each barrier portion 23 and the inner surface 3s of the cylinder 3 is desirably set to fall within a range greater than or equal to 0.05 mm and smaller than or equal to 2 mm. Furthermore, more desirably, the gap 27 is set to fall within a range greater than or equal to 0.05 mm and smaller than or equal to 0.7 mm. Conveyance of the raw materials through the gap 27 can be thereby limited certainly. The raw materials therefore do not flow beyond each of the barrier portions 23.

In each of the barrier portions 23, a spirally twisted flight 41 may be provided instead of the barrier annular body 28 as shown in, for example, FIG. 19. The flight 41 protrudes from the outer circumferential surface of the tube 13 in the circumferential direction toward the conveyance path 29. The flight 41 is twisted in the same direction as the direction of rotation of the screw main body 11.

When raw materials are kneaded by rotating the screw main body 11 counterclockwise, the flight 41 of each of the conveyance portions 23 is twisted to convey the raw materials from the base end to the tip of the screw main body 11. In other words, the twisting direction of the flight 41 is set to be counterclockwise similarly to a left-hand screw.

In contrast, when raw materials are kneaded by rotating the screw main body 11 clockwise, the flight 41 of each of the conveyance portions 23 is twisted to convey the raw materials from the base end to the tip of the screw main body 11. In other words, the twisting direction of the flight 41 is set to be clockwise similarly to a right-hand screw.

At each barrier portion 23, a twist pitch of the flight 41 is set to be the same as or smaller than a twist pitch of the flights 25 and 26 at the conveyance portions 22 and 24. Furthermore, a gap between a top part of the flight 41 and the inner surface 3s of the cylinder 3 is set to fall within the above-explained range of the gap 27.

Incidentally, the length of each of the conveyance portions 22 and 24 in the axial direction of the screw main body 11 is appropriately set according to, for example, the type of the raw materials, the degree of kneading of the raw materials, the amount of production of the kneaded materials per unit time, and the like. The conveyance portions 22 and 24 indicate areas in which the flights 25 and 26 are formed on at least the outer circumferential surfaces of the tubes 13, but are not limited to areas between a start point and an end point of the flights 25 and 26.

In other words, areas distant from the flights 25 and 26 of the outer circumferential surfaces of the tubes 13 may be regarded as the conveyance portions 22 and 24. For example, if a cylindrical spacer or a cylindrical collar is arranged at a position adjacent to the tubes 13 comprising the flights 25 and 26, the spacer or the collar may also be included in the conveyance portions 22 and 24.

In addition, the lengths of the barrier portions 23 in the axial direction of the screw main body 11 are appropriately set according to, for example, the type of the raw material, the degree of kneading of the raw material, the amount of production of the kneaded material per unit time, and the like. The barrier portions 23 function to dam up the flow of the raw materials conveyed by the conveyance portions 22. The barrier portions 23 are adjacent to the conveyance portions 22 on the downstream side in the conveyance direction of the raw materials and are configured to prevent the raw materials fed by the conveyance portions 22 from being conveyed through the above-explained gap 27.

Each of the flights 25, 26, and 41 and the barrier annular body 28 (cylinder surface 28s) protrude from the outer circumferential surfaces of the tubes 13 having the outer diameters D1 equal to each other toward the conveyance path 29, in the part of the above-explained screw 2 (screw main body 11) in which the kneading portion 11c is provided. For this reason, the outer circumferential surface in the circumferential direction of each of the tubes 13 defines a root diameter of the screw 2 in the kneading portion 11c. The root diameter matches the above-explained outer diameter D1 and is kept at a fixed value throughout the total length of the portion of the screw main body 11 in which the kneading portion 11c is provided.

In this case, the root diameter of the kneading portion 11c may be made larger to make the depth of the root smaller. According to such a structure, the kneaded materials generated by the screw 2 can be stably discharged from the discharge port 7. The depth of the root can be defined as a height dimension in the radial direction from the outer circumferential surface of the screw main body 11 (tube 13) to the outer diameter of each of the flights 25, 26, and 41, and the barrier annular body 28 (cylindrical surface 28s).

Furthermore, paths 37 extending in the axial direction are provided inside the part of the screw main body 11 in which the kneading portion 11c is provided. The paths 37 are arranged in the axial direction and the circumferential direction of the screw main body 11. The figures show, as an example, a structure in which two paths 37 arranged at regular intervals in the circumferential direction of the screw main body 11 are arranged at regular intervals in the axial direction.

Each path 37 is provided at a position eccentric from the axis 10 which is the center of rotation of the screw 2. In other words, the paths 37 are deviated from the axis 10. For this reason, the paths 37 revolve around the axis 10 in association with the rotation of the screw main body 11.

The shape of the path 37 can be set to be, for example, a circular shape, a rectangular shape, an elliptical shape, and the like as its cross-sectional shape if the shape allows the raw materials to flow. The figures show, as an example, the paths 37 having sections shaped in circular holes. In this case, an inner diameter (bore) of the holes is desirably set to be greater than or equal to 1 mm and smaller than 6 mm. More desirably, the inner diameter (bore) of the holes is set to be greater than or equal to 1 mm and smaller than 5 mm.

In the screw main body 11 (kneading portion 11c), the tubes 13 of the conveyance portions 22 and the barrier portions 23 comprise tubular wall surfaces 30 (see FIG. 3 to FIG. 5) defining the paths 37, which are the holes. In other words, the paths 37 are the hole composed of hollow spaces alone. The wall surfaces 30 continuously surround the hollow paths 37 in the circumferential direction. The paths 37 are thereby formed as the hollow spaces which allow only the flow of the raw materials. In other words, no other elements constituting the screw main body 11 exist in the paths 37. In this case, the wall surfaces 30 revolve around the axis 10 without rotating around the axis 10 when the screw main body 11 rotates.

According to the paths 37, when the raw materials conveyed through the conveyance path 29 by each of the conveyance portions 22 flow through the paths 37, the "extension action" generated when the raw materials pass from a wide portion (conveyance path 29) to a narrow portion (paths 37) can be effectively imparted to the raw materials. The paths 37 are therefore defined as portions (extension action regions) which impart the extension action to the raw materials.

A specific structure of the above-described paths 37 will be described below.

As shown in FIG. 2 and FIG. 5, the paths 37 are arranged in the axial direction (longitudinal direction) and spaced apart from each other, inside the screw main body 11

(kneading portion 11c) in which the conveyance portions 22 and the barrier portions 23 are alternately arranged in the axial direction (longitudinal direction), in the extruder screw 2 according to the present embodiment. The raw materials having their conveyance limited by the barrier portions 23 flow to each of the paths 37. In each of the paths 37, the raw materials flow in the same direction as the direction of conveyance of the conveyance portions 22. The screw 2 comprising the screw main body 11 (kneading portion 11c) having the function of continuously imparting the shearing action and extension action to the raw materials is achieved by such a screw structure.

If one barrier portion 23 and two conveyance portions 22 adjacent to both sides of the barrier portion 23 are noticed, in the above-explained screw structure, one path 37 is provided across the tube 13 of the barrier portion 23 and the tubes 13 of two conveyance portions 22. This structure can be recognized as one structurally integrated unit.

The screw main body 11 (kneading portion 11c) according to the present embodiment is formed by arranging the units in the axial direction (longitudinal direction). In the above-explained screw structure, one conveyance portion 22 and one barrier portion 23 are provided adjacent to each other in one tube 13 (see FIG. 4). The above-explained units can be arranged in the axial direction (longitudinal direction) by arranging the tubes 13 in the axial direction (longitudinal direction). Thus, a unidirectional screw structure in which raw materials never pass through the portion where they have once passed can be thereby achieved when the specific passage of the raw materials is tracked.

In other words, the above-explained unit can be recognized as one functionally integrated module. As functions of one module, for example, the function of imparting the shearing action to the raw materials, the function of imparting the extension action to the raw materials, the function of damming up the conveyance of the raw materials by the barrier portion 23, the function of guiding the raw materials having the pressure increased by the barrier portion 23 to the paths 37, the function of forming a raw material reservoir R in which the filling rate of the raw materials is 100% immediately before the barrier portion 23, and the like are assumed.

Furthermore, the path 37 includes an entrance 38, an exit 40, and a path main body 39 connecting the entrance 38 and the exit 40, in the above-explained screw structure. The entrance 38 and the exit 40 are provided on both sides of one barrier portion 23 in one unit explained above. In other words, the entrance 38 is provided on one side of the path main body 39 (portion closer to the base end of the screw main body 11). The exit 40 is provided on the other side of the path main body 39 (portion closer to the tip of the screw main body 11).

More specifically, the entrance 38 is opened to the outer circumferential surface of the conveyance portion 22, in the conveyance portion 22 adjacent to the barrier portion 23 from the side of the base end of the screw main body 11. In contrast, the exit 40 is opened to the outer circumferential surface of the conveyance portion 22, in the conveyance portion 22 adjacent to the barrier portion 23 from the side of the tip of the screw main body 11.

In this case, the positions where the entrance 38 and exit 40 are formed can be set freely within the range of the conveyance portion 22. For example, both of the entrance 38 and the exit 40 may be made closer to the barrier portion 23 or remote from the barrier portion 23. Furthermore, either of the entrance 38 and the exit 40 may be made closer to the barrier portion 23 or remote from the barrier portion 23. The figures show, as an example, a structure in which the entrance 38 is made closer to the barrier portion 23 while the exit 40 is made remote from the barrier portion 23.

The entrance 38 is a hole bored from the outer circumferential surface of the tube 13 (screw main body 11) in the kneading portion 11c, in the radial direction. The entrance 38 can be formed by, for example, machining using a drill. As a result, a bottom portion 38a of the entrance 38 is formed as an inclined surface shaved off in a conical shape by the tip of the drill. In other words, the conical bottom portion 38a is an inclined surface widening toward the outer circumferential surface of the screw main body 11.

The exit 40 is a hole bored from the outer circumferential surface of the tube 13 (screw main body 11) in the kneading portion 11c, in the radial direction. The exit 40 can be formed by, for example, machining using a drill. As a result, the bottom portion 40a of the exit 40 is formed as an inclined surface shaved off in a conical shape by the tip of the drill. In other words, the conical bottom portion 38a is an inclined surface widening toward the outer circumferential surface of the screw main body 11.

The path main body 39 is formed along two tubes 13 adjacent to each other. The path main body 39 is composed of first and second portions 39a and 39b. The first portion 39a is formed inside either of the tubes 13. The second portion 39b is formed inside the other tube 13.

In the tube 13, the first portion 39a is formed along an area opposed to the barrier portion 23. The first portion 39a extends parallel along the axis 10. One of ends of the first portion 39a is opened in an end face 13a of the tube 13. The other end of the first portion 39a is closed at an inner portion (i.e., an end wall 13b) of the tube 13. Furthermore, the other end of the first portion 39a is connected to the above-explained entrance 38 to communicate with the entrance 38.

In the other tube 13, the second portion 39b is formed along the area opposed to the conveyance portion 22. The second portion 39b extends parallel along the axis 10. One of ends of the second portion 39b is opened at an end surface 13a of the tube 13. In contrast, the other end of the second portion 39b is closed at an inner portion (i.e., an end wall 13b) of the tube 13. Furthermore, the other end of the second portion 39b is connected to the above-explained exit 40 to communicate with the exit 40.

The path main body 39 can be formed by fastening the tube 13 in which the first portion 39a is formed and the tube 13 in which the second portion 39b is formed in the axial direction and bringing their end surfaces 13a into close contact with each other. In this state, the path main body 39 extends linearly and continuously in the axial direction of the screw main body 11 without branching halfway. Both sides of the path main body 39 are connected to the entrance 38 and exit 40 to communicate with the entrance 38 and exit 40.

In this case, the bore of the path main body 39 may be set to be smaller than or the same as the bores of the entrance 38 and the exit 40. In either of the cases, the path sectional area defined by the bore of the path main body 39 is set to be much smaller than the annular sectional area of the above-explained conveyance path 29 in the radial direction.

In the present embodiment, each of the tubes 13 on which at least parts of the flights 25, 26, and 41 and the barrier annular body 28 are formed can be recognized as a screw element corresponding to each of the conveyance portions 22 and 24 and the barrier portion 23.

Accordingly, the portion of the of the screw main body 11 in which the kneading portion 11c is provided can be constituted by sequentially arranging the tubes 13 on the outer circumference of the rotary shaft 14 as the screw elements. For this reason, the conveyance portions 22 and 24, and the barrier portions 23 can be exchanged and rearranged and the work for the exchange and rearrangement can easily be executed, in accordance with, for example, the degree of kneading of the raw materials.

Furthermore, the path main body 39 of each of the paths 37 is formed and the entrance 38 and the exit 40 of the path 37 are integrally connected through the path main body 39 by fastening the tubes 13 serving as the screw elements in the axial direction and bringing the tubes 13 into close contact with each other. Accordingly, to form the path 37 in the screw main body 11, processing for providing the path 37 may be executed for each of the tubes 13 having a length sufficiently shorter than the total length of the screw main body 11 (kneading portion 11c). Machining and handling in forming the path 37 can be therefore facilitated.

Furthermore, in the screw structure of the extruder screw 2, the above-explained introduction portion 15 has a structure for continuously introducing the raw materials conveyed from the melting and mixing portion 11b to the kneading portion 11c. FIG. 1 and FIG. 2 show an example of such an introduction structure. The introduction portion 15 is configured to comprise an introducing tube 13p instead of the conveyance portion 22 on the upstream side, in the above-explained unit. An entrance 38 communicating with the path 37 is formed on the outer circumferential surface of the introducing tube 13p. The introducing tube 13p is arranged adjacently between a barrier portion 23 provided at the base end of the screw main body 11 in the kneading portion 11c and the end face 16 of the melting and mixing portion 11b.

According to such an introducing structure, the pressure of the raw materials conveyed from the melting and mixing portion 11b is increased by limiting its conveyance by the barrier portion 23, the raw materials flow into the entrance 38 of the introducing tube 13p, pass through the path 37 (path main body 39), and then flow out of the exit 40 of the conveyance portion 22 on the downstream side. The raw materials conveyed from the melting and mixing portion 11b can be thereby continuously introduced into the kneading portion 11c.

Next, the operation of kneading the raw materials by the single screw extruder screw 2 will be explained below. In this explanation of operation, the "outer circumferential surface of the screw main body 11" indicates the outer circumferential surface of the screw main body 11 in the circumferential direction excluding both end surfaces in the longitudinal direction. Furthermore, in this explanation of operation, kneading is assumed to be executed while rotating the extruder screw 2 counterclockwise in the leftward direction at a rotational speed of, for example, 50 rpm to 100 rpm.

Figure 6:
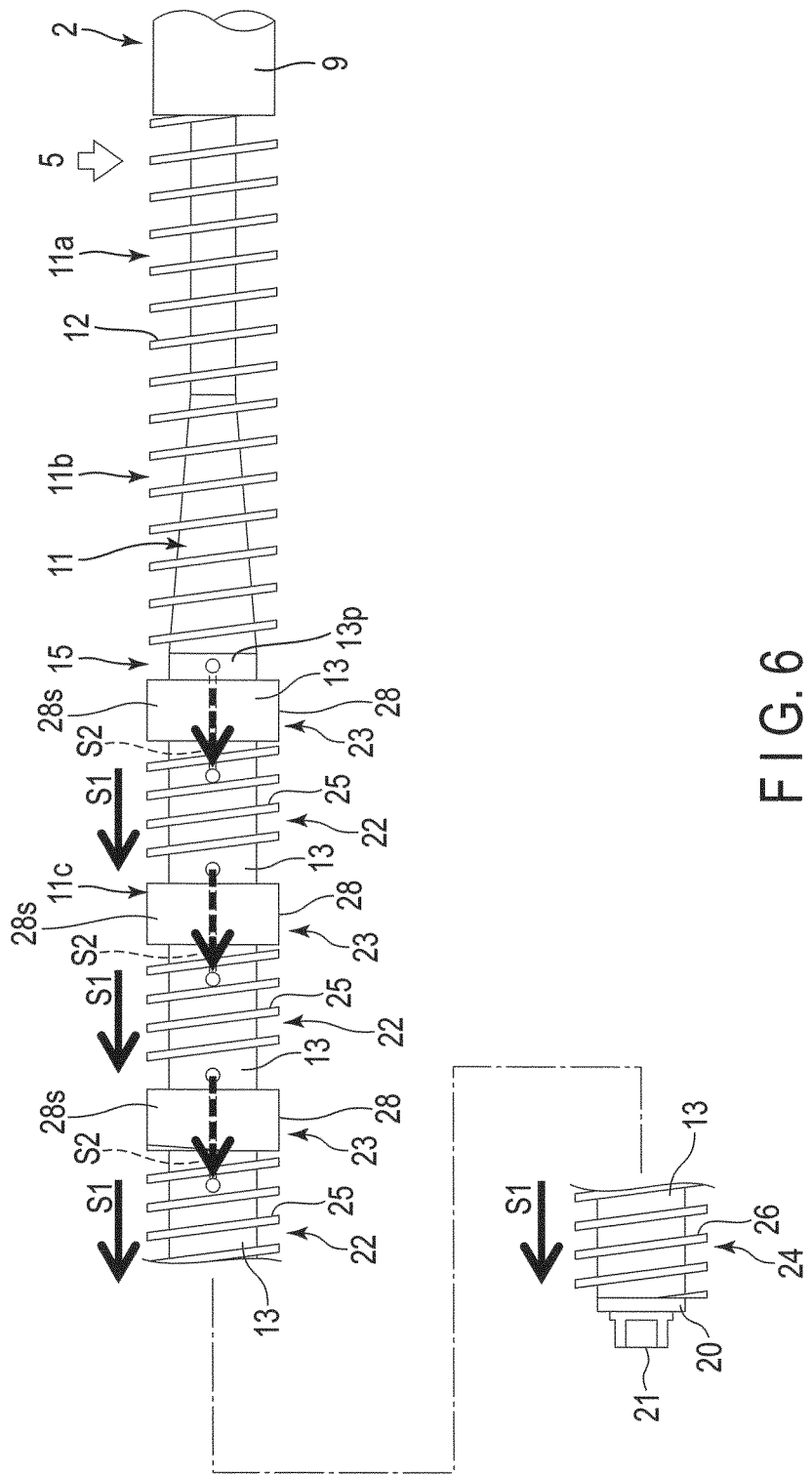
FIG. 6 is a view schematically showing a flowing state of raw materials generated by the extruder screw.
Figure 7:
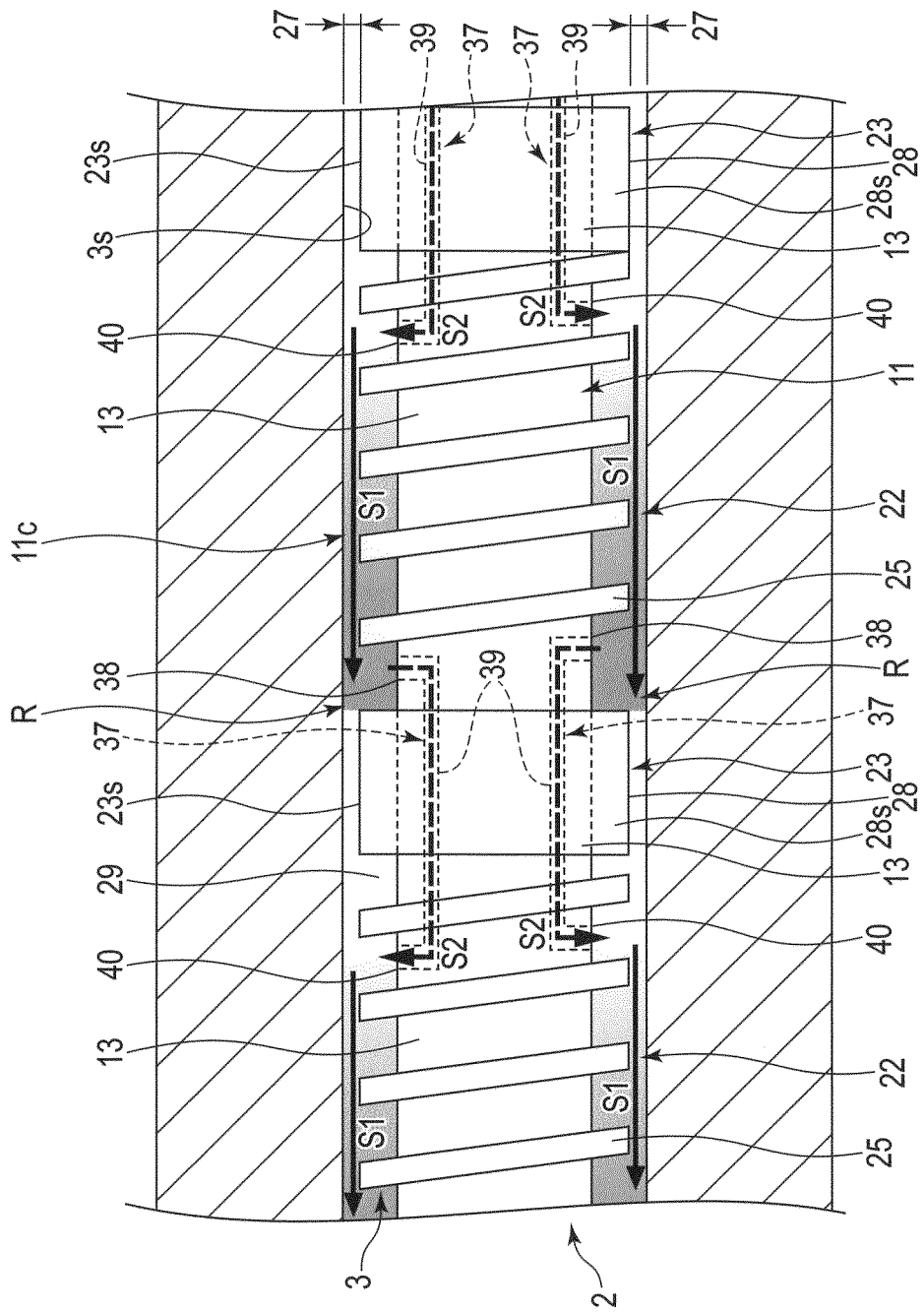
FIG. 7 is an expanded sectional view showing a part of the flowing state of the raw materials in a cylinder of the extruder.

As shown in FIG. 6 and FIG. 7, materials 6 (see FIG. 1) are supplied from the supply port 5 into the cylinder 3 in a state in which the extruder screw 2 is rotated counterclockwise.

The pellet-like resin supplied into the cylinder 3 is conveyed from the transfer portion 1ie to the melting and mixing portion 11b by the flight 12. In the melting and mixing portion 11b, the resin is subjected to compression mainly from the continuously narrowed gap while being heated by the heater. As a result, the raw materials formed by melting and mixing two types of resins are conveyed from the melting and mixing portion 11b.

The raw materials conveyed from the melting and mixing portion 11b are introduced into the kneading portion 11c via the introduction portion 15. The pressure of the raw materials conveyed from the melting and mixing portion 11b is increased by limiting its conveyance by the barrier portions 23, and the raw materials flow into the entrance 38 of the introducing tube 13p, pass through the path main body 39, and flow out of the exit 40 of the conveyance portion 22 on the downstream side.

The raw materials flowing out of the exit 40 are continuously supplied onto the outer circumferential surface of the screw main body 11 at the kneading portion 11c. The supplied raw materials are conveyed from the base end toward the tip of the screw main body 11 in the direction S1 by the flight 25 of the conveyance portion 22.

The "shearing action" caused by the difference in speed between the flights 25 of the conveyance portions 22 rotating along the conveyance path 29 and the inner surface 3s of the cylinder 3 is imparted to the raw materials and the stirring action caused by the rotation of the spiral flights 25 themselves is also imparted to the raw materials while the raw materials are conveyed in the direction S1. The degree of kneading of the raw materials is thereby promoted.

The conveyance of the raw materials conveyed in the direction S1 is limited by the barrier portions 23. In other words, the barrier portions 23 act to press the raw materials from the tip toward the base end of the screw main body 11, in the direction opposite to the direction S1. As a result, the flow of the raw materials is dammed up by the barrier portions 23.

At this time, the pressure applied to the raw materials is increased by damming up the flow of the raw materials. More specifically, the filling rate of the raw materials at a part of the conveyance path 29 corresponding to the conveyance portion 22 of the screw main body 11 (kneading portion 11c) is expressed by gradation in FIG. 7. In other words, the filling rate of the raw materials becomes higher as the tone is thicker, in the conveyance path 29. As clarified from FIG. 7, the filling rate of the raw materials becomes higher as the raw materials are made closer to the barrier portions 23, in the conveyance path 29 corresponding to the conveyance portions 22. The filling rate of the raw materials is 100% just before the barrier portions 23.

For this reason, a "raw material reservoir R" in which the filling rate of the raw materials becomes 100% is formed just before the barrier portions 23. In the raw material reservoir R, the pressure of the raw materials is raised by damming up the flow of the raw materials. The raw materials having their pressure raised continuously flow into the path main body 39 from the entrance 38 opened on the outer circumferential surface of the conveyance portions 22 (tubes 13) and then flow from the base end toward the tip of the screw main body 11 through the inside of the path main body 39 in a direction S2, i.e., the same direction as the direction S1.

As explained above, the path sectional area defined by the bore of the path main body 39 is much smaller than the annular sectional area of the conveyance path 29 in the radial direction of the cylinder 3. The spread area based on the bore of the path main body 39 is much smaller than the spread area of the annular conveyance path 29, depending on the other point of view. For this reason, when the raw materials flow from the entrance 38 into the path main body 39, the raw materials are radically narrowed and the "extension action" is thereby imparted to the raw materials.

Furthermore, since the path sectional area is sufficiently smaller than the annular sectional area, the raw materials collected in the raw material reservoir R do not disappear. In other words, the raw materials collected in the raw material reservoir R partially flow into the entrance 38 continuously.

During this time, new raw materials are fed to the barrier portions 23 by the flights 25 of the conveyance portions 22. As a result, the filling rate in the raw material reservoir R just before the barrier portions 23 is maintained at 100% at all times. At this time, even when the amount of conveyance of the raw materials executed by the flights 25 is slightly varied, the variation state is absorbed by the raw materials remaining in the raw material reservoir R. The raw materials can be thereby supplied to the path main body 39 continuously and stably. The extension action can be therefore imparted to the raw materials uninterruptedly and continuously, in the path main body 39.

The raw materials passing through the path main body 39 flow from the exit 40 onto the outer circumferential surface of the screw main body 11 (kneading portion 11c). Since the above-explained conveyance portions 22 and the barrier portions 23 are alternately arranged in the axial direction at the screw main body 11 (kneading portion 11c), the raw materials in the cylinder 3 are continuously conveyed from the base end to the tip of the screw main body 11 (kneading portion 11c) in a state in which the shearing flow and the extension flow are repeated, by repeating a sequence of the shearing and extension flows. The degree of kneading of the raw materials is thereby increased.

The conveyed kneaded materials are conveyed in the direction S1 by the flight 26 of the discharge conveyance portion 24 and the continuously extruded from the discharge port 7 (see FIG. 1 and FIG. 2).

As described above, according to the present embodiment, the degree of kneading of the raw materials can be improved without elongating the screw 2 or single screw extruder, by allowing the extruder screw 2 to comprise the function of imparting the extension action to the raw materials.

According to the present embodiment, the shearing action and the extension action can be imparted continuously to the raw materials a plurality of times. For this reason, the number of times and the length of time of imparting the shearing action and the extension action to the raw materials can be increased. As a result, the degree of kneading can be controlled more accurately than that in the conventional method.

According to the present embodiment, in an existing extruder screw comprising a supply portion, a compression portion, and a measuring portion from the base end toward the tip and comprising no paths through which the raw materials flow, the supply portion is replaced with a transfer portion 11a, the compression portion is replaced with a melting and mixing portion 11b, and the measuring portion is replaced with a kneading portion 11c in which a combination of the conveyance portions 22, the barrier portions 23, and the paths 37 is arranged. The existing extruder screw can be thereby allowed to comprise both the function of imparting the shearing action and the function of imparting the extension action. As a result, an extruder screw having the handling facility maintained and increased can be implemented.

In addition, the extruder screw 2 according to the present embodiment comprises a unidirectional screw structure in which raw materials at the kneading portion 11c do not flow the same portion again when the specific flow is tracked. For this reason, the extension action can be imparted evenly to all the raw materials at the kneading portion 11c. Furthermore, according to the unidirectional screw structure, the specific flow of the raw materials is not mixed with the flow of the raw materials different in the kneading state which exists before or after the specific flow of the raw materials. All the raw materials can be thereby kneaded evenly and uniformly.

According to the present embodiment, a segment type screw 2 capable of holding screw elements in an arbitrary order and combination by setting the outer diameter D1 of the screw main body 11 (each tube 13) to a fixed value, i.e., setting the root diameter of the screw 2 to a fixed value, at the portion at which the kneading portion 11c is provided, can be implemented. Convenience in, for example, change or adjustment in the specification or service and maintenance, of the screw 2, can be remarkably improved by segmenting the screw 2.

Furthermore, according to the present embodiment, the extension action can be imparted uniformly, stably, and efficiently to the raw materials passing through the paths 37 (path main bodies 39) by setting the sectional area of the paths 37 (path main bodies 39) to be much smaller than the sectional area of the conveyance path 29 configured to convey the raw materials.

While one of the embodiments of the present invention has been described, the present invention is not limited to the embodiment, and the following modified examples are also included in the technical scope of the present invention.

In the above-described embodiment, FIG. 2 and FIG. 5 show the paths 37 in which both ends of the path main body 39 are connected to the entrance 38 and the exit 40 at positions displaced from the bottom parts 38a and 40a of the entrance 38 and the exit 40. However, the relationship in connection of the path main body 39 with the entrance 38 and the exit 40 is not limited to the above-described embodiment, but the following relationship in connection is also included in the technical scope of the present invention.

FIG. 8 to FIG. 13 show, as examples, the path 37 in which both sides of the path main body 39 are connected to the bottom portions 38a and 40a of the entrance 38 and the exit 40. More specifically, one of the ends of the path main body 39, i.e., the other end of the first portion 39a is connected to the bottom portion 38a of the entrance 38. Furthermore, the other side of the path main body 39, i.e., the other end of the second portion 39b is connected to the bottom portion 40a of the exit 40.

FIGS. 8(A) and (B) and FIGS. 9(A) and (B) show the path 37 according to a first modified example. In the path 37, an end surface of one side (the other end of the first portion 39a) of the path main body 39 is connected to the bottom portion 38a of the entrance 38. The opening 38b communicating with the path main body 39 (first portion 39a) is formed in the bottom portion 38a. In contrast, an end surface of the other side (the other end of the second portion 39b) of the path main body 39 is connected to the bottom portion 40a of the exit 40. The opening 40b communicating with the path main body 39 (second portion 39b) is formed in the bottom portion 40a.

An opening 38b of the entrance 38 is formed in an area opposed to the bottom portion 38a widening toward the outer circumferential surface of the screw main body 11. In contrast, an opening 40b of the exit 40 is formed in an area opposed to the bottom portion 40a widening toward the outer circumferential surface of the screw main body 11.

In this case, the raw materials flowing into the entrance 38 are guided to the opening 38b along the inclination of the bottom portion 38a. As a result, all the raw materials flow continuously and smoothly into the path main body 39 without stagnating inside the entrance 38. The raw materials which have passed through the path main body 39 subsequently flow into the exit 40. The raw materials flowing into the exit 40 are guided to the outer circumferential surface of the screw main body 11 along the inclination of the bottom portion 40a. As a result, all the raw materials flow continuously and smoothly to the outer circumferential surface of the screw main body 11 without stagnating inside the exit 40.

Thus, the extension action can be imparted to the raw materials passing through the path 37 without any omission, uniformly, and continuously while preventing the raw materials from locally stagnating inside the path 37.

FIGS. 10(A) and (B) and FIGS. 11(A) and (B) show the path 37 according to a second modified example. In the path 37, the part closer to an end surface 39s of one side of the path main body 39 (the other end of the first portion 39a), i.e., the portion in front of the end surface 39s is connected to the bottom portion 38a of the entrance 38. Two openings 38b communicating with the path main body 39 (first portion 39a) are formed in the bottom portion 38a. In contrast, the part closer to an end surface 39s of the other side of the path main body 39 (the other end of the second portion 39b), i.e., the portion in front of the end surface 39s is connected to the bottom portion 40a of the exit 40. Two openings 40b communicating with the path main body 39 (second portion 39b) are formed in the bottom portion 40a.

Two openings 38b of the entrance 38 are formed in an area opposed to the bottom portion 38a widening toward the outer circumferential surface of the screw main body 11. In contrast, two openings 40b of the exit 40 are formed in an area opposed to the bottom portion 40a widening toward the outer circumferential surface of the screw main body 11. Since the function and advantage of the path 37 according to the second modified example are the same as those of the path 37 according to the first modified example, their explanations are omitted.

In the above-explained embodiment and modified examples, the opening direction of the entrance 38 and exit 40 is assumed to be a direction orthogonal to the axis 10, but is not limited to this. As shown in, for example, FIGS. 12(A) and (B), and FIGS. 13(A) and (B), the opening directions of the entrance 38 and exit 40 may be set to the directions (directions indicated by dotted lines) intersecting the axis 10. In this case, both sides of the path main body 39 may be opened in directions and entrances 38 and 38-1 and exits 40 and 40-1 may be thereby provided.

Furthermore, the entrance 38 may desirably be formed to be recessed from the outer circumferential surface of the screw main body 11. The raw materials can be thereby made to flow into the entrance 38 more easily.

Furthermore, in the above-explained embodiment and modified examples, the path 37 comprising the path main body 39 parallel to the axis 10 is assumed, but the path 37 is not limited to this, and the path 37 comprising the path main body 39 intersecting the axis 10 is also included in the technical scope of the present invention. For example, the other side of the path main body 39 having one side connected to the entrance 38 is directly opened to the outer circumferential surface of the screw main body 11 (tube 13) by removing the exit 40. In this case, the path main body 39 having a gradient rising from one side to the other side is formed.

According to such a structure, the raw materials flowing from the entrance 38 into the path main body 39 receive a centrifugal action at the time of rotation of the screw main body 11, and thereby flow through the path main body 39 more smoothly and flow to the outer circumferential surface of the screw main body 11 (tube 13). At this time, the extension action is imparted to the raw materials more efficiently and continuously. As a result, the degree of kneading of the raw materials can be further increased.

In addition, in the above-explained embodiment, the paths 37 (specifically, path main bodies 39) are assumed to be formed inside the screw main body 11 (tube 13) at the kneading portion 11c but, instead of this, the paths 37 (path main bodies 39) may be formed at the boundary portion between each of the tubes 13 and the rotary shaft 14 when the rotary shaft 14 is made to penetrate along the inner circumferential surface of each of the tubes 13 constituting the screw main body 11 (kneading portion 11c). FIG. 14 to FIG. 17 show the structure of the portion corresponding to FIG. 3 as the structure of the present modified example.

Figure 14:
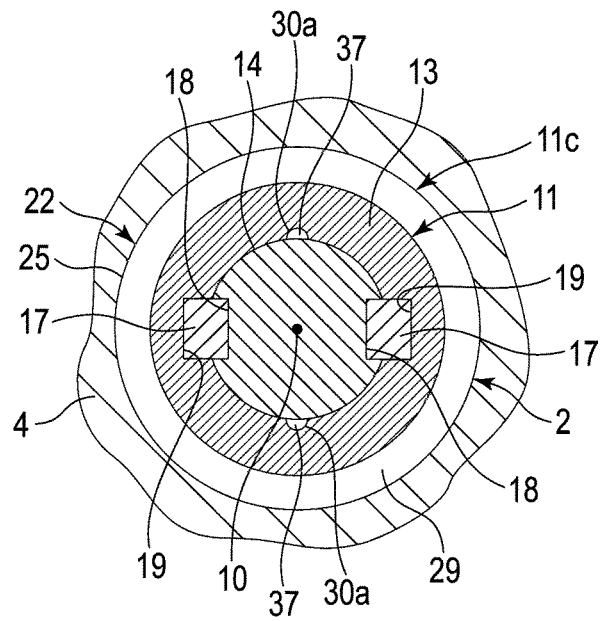
FIG. 14 is a longitudinal sectional view schematically showing the structure of the extruder screw in which a path is provided along an inner circumferential surface of a tube constituting a kneading portion in the modified example of the present invention.

The paths 37 shown in FIG. 14 are composed of wall surfaces 30a formed by depressing parts of the inner circumferential surfaces of the tubes 13 in a shape of depression in the axial direction. In this case, the paths 37 surrounded by the wall surfaces 30a and the outer circumferential surface of the rotary shaft 14 can be defined by urging the rotary shaft 14 to penetrate the inner circumferential surfaces of the tubes 13.

Figure 15:
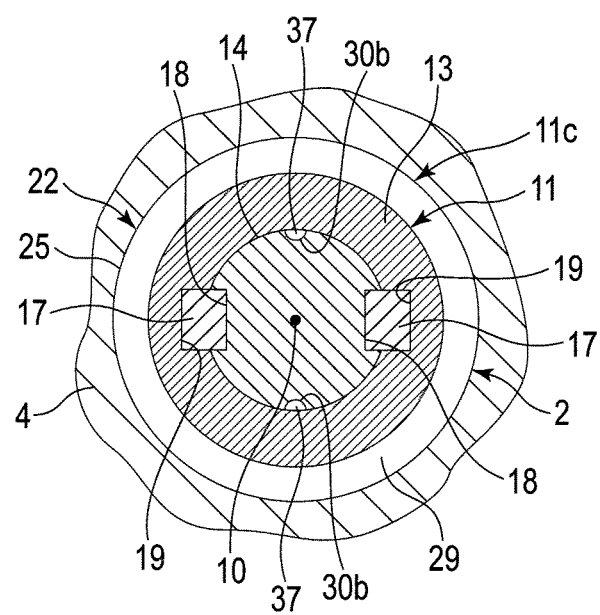
FIG. 15 is a longitudinal sectional view schematically showing the structure of the extruder screw in which a path is provided along an outer circumferential surface of a rotary shaft constituting the kneading portion in the modified example of the present invention.

The paths 37 shown in FIG. 15 are composed of wall surfaces 30a formed by depressing parts of the outer circumferential surface of the rotary shaft 14 in a concave shape in the axial direction. In this case, the paths 37 surrounded by the wall surfaces 30b and the inner circumferential surface of the tube 13 can be defined by urging the rotary shaft 14 to penetrate the inner circumferential surfaces of the tubes 13.

Figure 16:
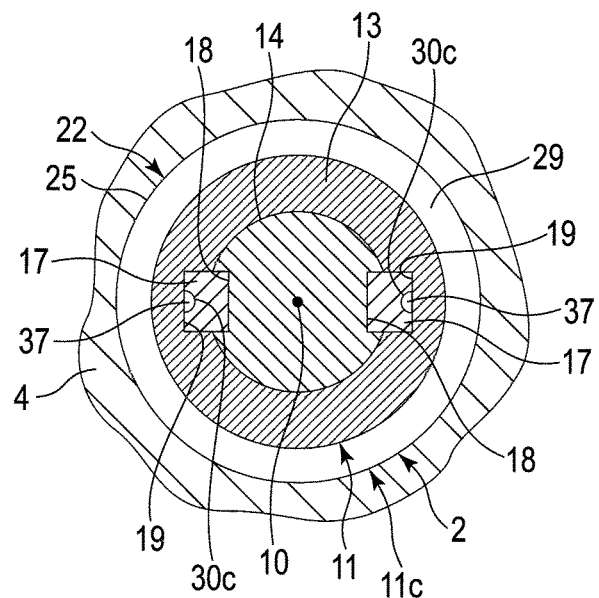
FIG. 16 is a longitudinal sectional view schematically showing the structure of the extruder screw in which a path is provided along a surface of a key constituting the kneading portion in the modified example of the present invention.

The paths 37 shown in FIG. 16 are composed of wall surfaces 30c formed by depressing parts of the outer circumferential surfaces of the keys 17 in the shape of depression in the axial direction. In this case, the paths 37 surrounded by the wall surfaces 30c and groove bottom surfaces of the keyways 19 can be defined by urging the rotary shaft 14 to penetrate the inner circumferential surfaces of the tubes 13.

Since the wall surfaces 30a, 30b, and 30c can be formed by only processing the parts exposed to the outside, in the shape of depression, in any one of the paths 37, the forming work can easily be executed. In this case, for example, various shapes such as a semicircular shape, a triangular shape, an elliptical shape, a rectangular shape, and the like can be applied as the shapes of the concave wall surfaces 30a, 30b, and 30c.

Figure 17:
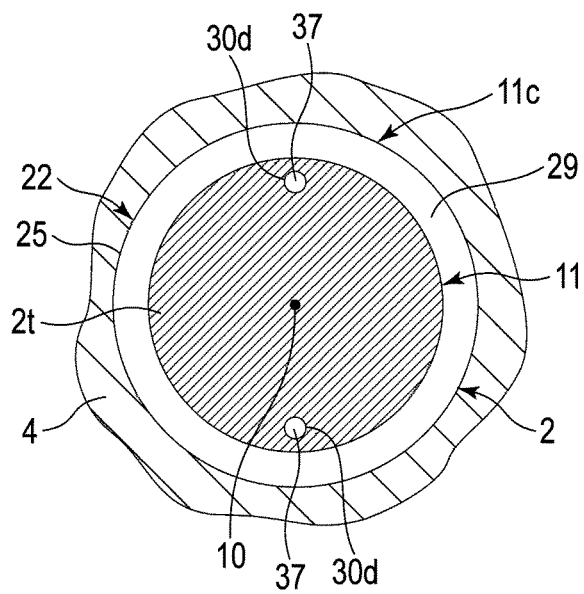
FIG. 17 is a longitudinal sectional view schematically showing the structure of the extruder screw in which a screw main body is formed of one shaft-like member in the modified example of the present invention.

Furthermore, in the above-described embodiment, the part of the screw main body 11 at which the kneading portion 11c is provided is composed of the tubes 13 and the rotary shaft 14 but, instead of this, the screw main body 11 (kneading portion 11c) may be composed of one straight shaft-like member 2t as shown in FIG. 17. In this case, the above-explained conveyance portions and barrier portions are provided on the outer circumferential surface of the solid screw main body 11 (kneading portion 11c) and the above-explained paths 37 are provided inside the screw main body 11 (kneading portion 11c). The figure shows, as an example, a pair of paths 37 provided at positions eccentric from the axis 10 and defined by cylindrical wall surfaces 30d, but the arrangement of each of the paths 37 is not limited by this.

In addition, in the above-explained embodiment, the single screw extruder 1 in which one extruder screw 2 is rotatably inserted in the cylinder 3 of the barrel 4 is assumed but, instead of this, the technical idea of the present invention can also be applied to a twin screw extruder 34 in which two extruder screws 31 are rotatably inserted in the cylinder 33 of the barrel 32, and the same advantages can be achieved.

Figure 18:
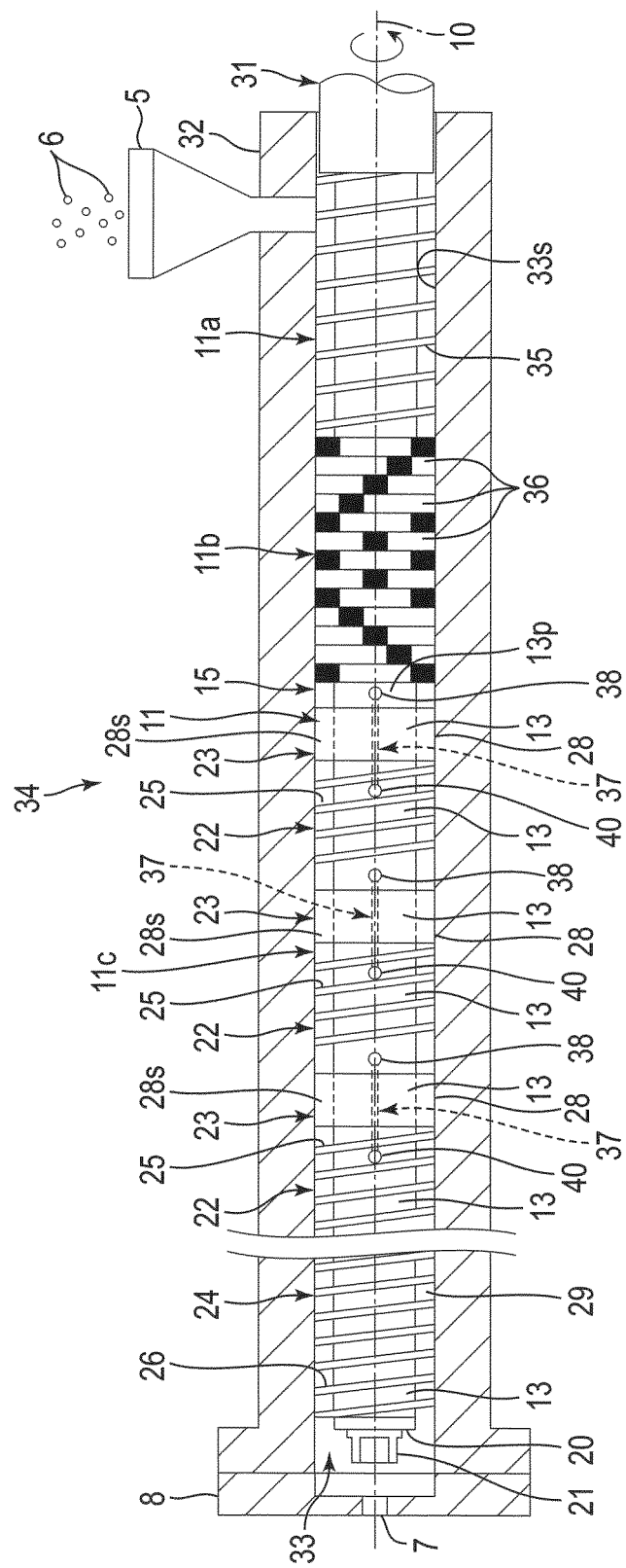
FIG. 18 is a transverse sectional view showing the external structure of the extruder screw in the overall structure of the twin screw extruder according to the modified example of the present invention.

FIG. 18 shows an example of the twin screw extruder 34. The figure shows only one extruder screw 31 of two extruder screws 31. The other extruder screw is not shown since it is hidden behind the extruder screw 31.

In the twin screw extruder 34, two extruder screws 31 can be rotated in the same direction in a state of engaging with each other. Similarly to the above-explained embodiment, the screw main body 11 is provided at each of two extruder screws 31 so as to rotate integrally with the screw 31. The transfer portion 11a, the melting and mixing portion 11b, and the kneading portion 11c are constituted between the screw main bodies 11, in the order from the base end to the tip of the screw main body 11, in a state in which the extruder screws 31 engage with each other.

The transfer portion 11a continuously conveys the materials 6 supplied from the supply port 5 into the cylinder 33, toward the melting and mixing portion 11b. A spiral flight 35 is continuously formed on the outer circumferential surface of each of screw main bodies 11 in the transfer portion 11a. The flight 35 is configured to continuously convey each of the materials 6 supplied from the supply port 5 into the cylinder 33, from the transfer portion 11a toward the melting and mixing portion 11b. For this reason, the flight 35 is twisted in a direction opposite to the direction of rotation of the screw main bodies 11.

The melting and mixing portion 11b continuously melts and mixes each of the materials 6 conveyed from the transfer portion 11a. Each of the screw main bodies 11 in the melting and mixing portion 11b is configured to include disks 36 adjacent to each other in the axial direction. The disks 36 are arranged in a state in which the phase difference is applied to the adjacent disks 36.

Similarly to the above-explained embodiment, the conveyance portions 22 and the barrier portions 23 are alternately arranged in the axial direction, in each of the screw main bodies 11, in the kneading portion 11c. At the barrel 4, an inner surface 33s of the cylinder 33 is configured to have a shape which can accommodate both of two extruder screws 31 engaging with each other and simultaneously rotate the extruder screws 31 in the same direction. The other constituent elements are the same as those of the above-described embodiment and are not therefore explained.

According to such a twin screw extruder 34, the materials 6 supplied from the supply port 5 into the cylinder 33 are continuously conveyed from the transfer portion 11a to the melting and mixing portion 11b, in a state in which two extruder screws 31 are rotated in the same direction at a rotational speed of, for example, 100 rpm to 300 rpm. Each of the materials 6 is continuously melted and mixed in the melting and mixing portion 11b. At this time, the melted and mixed materials 6 become raw materials for kneading, which are conveyed from the melting and mixing portion 11b to the kneading portion 11c. The conveyed raw materials are introduced into the kneading portion 11c through the above-explained introduction portion 15, then become the kneaded materials having an increased degree of kneading and is continuously extruded from the discharge port 7.

If the conveyance action of feeding the raw materials from the melting and mixing portion 11b to the introduction portion 15 is insufficient at the twin screw extruder 34, a raw material feeding mechanism is desirably provided between the melting and mixing portion 11b and the introduction portion 15. With respect to the raw material feeding mechanism, for example, a tube 13 at which the same flight as the flight 35 provided at the transfer portion 11a is formed may be prepared and such a cylinder 13 may be inserted between the melting and mixing portion 11b and the introduction portion 15. The raw materials can be thereby fed sufficiently from the melting and mixing portion 11b to the introduction portion 15.

In the above-described embodiment, the technical idea (extrusion technique of improving the degree of kneading) of the present invention is applied to the kneading of materials 6 but is not limited to this, and the technique is also applicable to a case where generation of minute unmelted parts is prevented or generation of non-uniform parts having a minute resin temperature is prevented when one type of material is melted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

REFERENCE SIGNS LIST

2 . . . extruder screw, 10 . . . axis, 11 . . . screw body, 11a . . . transfer portion, 11b . . . melting and mixing portion, 11c . . . kneading portion, 12 . . . flight, 13 . . . cylinder body, 14 . . . rotary shaft, 15 . . . introduction portion, 22 . . . conveyance portion, 23 . . . barrier portion, 24 . . . discharge conveyance portion, 25 and 26 . . . flight, 27 . . . gap, 28 . . . barrier annular body, 29 . . . conveyance path, 37 . . . path, 38 . . . entrance, 39 . . . path main body, 40 . . . exit.

What is claimed is:

1. An extruder screw comprising:
a transfer portion continuously conveying supplied materials;
a melting and mixing portion continuously melting and mixing the conveyed materials; and
a kneading portion continuously kneading raw materials obtained by melting and mixing the materials,
wherein
the transfer portion, the melting and mixing portion, and the kneading portion are provided in a screw main body rotating about a straight axis,
a part of the screw main body in which the kneading portion is provided is composed of a plurality of cylindrical bodies and a rotating shaft supporting the plurality of cylindrical bodies and rotating about the axis,
a plurality of conveyance portions conveying the raw materials and a plurality of barrier portions limiting conveyance of the raw materials are alternately arranged on the plurality of cylindrical bodies coaxially connected along the rotating shaft,
each of the barrier portions includes a path provided across the two conveyance portions disposed adjacent to both sides of the barrier portion and inside the cylindrical body of the barrier portion, the path comprising an entrance and an exit,
the entrance is opened in an outer circumferential surface of the cylindrical body in the conveyance portion adjacent to the barrier portion to urge the raw materials, having the conveyance limited by the barrier portion from a proximal end side of the screw main body to increase pressure on the raw materials, to flow into the entrance, the path is configured to urge the raw materials flowing from the entrance to flow toward the exit in a same direction as a direction of the conveyance of the conveyance portion, and the exit is opened in the circumferential surface of the cylindrical body in the conveyance portion adjacent to the barrier portion from a distal end side of the screw main body.

2. The extruder screw of claim 1, wherein
the part of the screw main body in which the kneading portion is provided is configured to have an outer diameter at a fixed value over a total length of the part.

3. An extruder comprising the extruder screw of claim 2, the extruder comprising:
a barrel comprising a cylinder in which the extruder screw is rotatably inserted;
a supply port which is provided in the barrel and through which the materials are supplied to the cylinder; and
a discharge port which is provided in the barrel and through which kneaded materials generated by the extruder screw are continuously extruded.

4. An extrusion method of kneading the raw materials with the extruder screw of claim 2, and continuously generating and extruding the kneaded materials,
wherein
in the kneading portion, the raw materials conveyed along the outer circumferential surface of the screw main body flow through the path and then return to an outer circumferential surface of the extruder screw, while the kneaded materials are continuously extruded.

5. The extruder screw of claim 1, wherein
a bore of the path is set to be a same as or smaller than a bore of the entrance of the path.

6. An extruder comprising the extruder screw of claim 5, the extruder comprising:
a barrel comprising a cylinder in which the extruder screw is rotatably inserted;
a supply port which is provided in the barrel and through which the materials are supplied to the cylinder; and
a discharge port which is provided in the barrel and through which kneaded materials generated by the extruder screw are continuously extruded.

7. An extrusion method of kneading the raw materials with the extruder screw of claim 5, and continuously generating and extruding the kneaded materials,
wherein
in the kneading portion, the raw materials conveyed along the outer circumferential surface of the screw main body flow through the path and then return to an outer circumferential surface of the extruder screw, while the kneaded materials are continuously extruded.

8. The extruder screw of claim 1, wherein
a bore of the path is set to be greater than or equal to 1 mm and smaller than 6 mm.

9. An extruder comprising the extruder screw of claim 8, the extruder comprising:
a barrel comprising a cylinder in which the extruder screw is rotatably inserted;
a supply port which is provided in the barrel and through which the materials are supplied to the cylinder; and
a discharge port which is provided in the barrel and through which kneaded materials generated by the extruder screw are continuously extruded.

10. An extrusion method of kneading the raw materials with the extruder screw of claim 8, and continuously generating and extruding the kneaded materials,
wherein
in the kneading portion, the raw materials conveyed along the outer circumferential surface of the screw main body flow through the path and then return to an outer circumferential surface of the extruder screw, while the kneaded materials are continuously extruded.

11. The extruder screw of claim 1, wherein
the screw main body extends from a base end connected to a rotating device to a tip, in an axial direction,
a flight spirally twisted along the outer circumferential surface of the screw main body is provided on the conveyance portion, and
the flight is twisted from the base end toward the tip of the screw main body in a direction opposite to a rotational direction of the screw main body as viewed from the base end side.

12. An extruder comprising the extruder screw of claim 11, the extruder comprising:
a barrel comprising a cylinder in which the extruder screw is rotatably inserted;
a supply port which is provided in the barrel and through which the materials are supplied to the cylinder; and
a discharge port which is provided in the barrel and through which kneaded materials generated by the extruder screw are continuously extruded.

13. An extrusion method of kneading the raw materials with the extruder screw of claim 11, and continuously generating and extruding the kneaded materials,
wherein
in the kneading portion, the raw materials conveyed along the outer circumferential surface of the screw main body flow through the path and then return to an outer circumferential surface of the extruder screw, while the kneaded materials are continuously extruded.

14. An extruder comprising the extruder screw of claim 1, the extruder comprising:
a barrel comprising a cylinder in which the extruder screw is rotatably inserted;
a supply port which is provided in the barrel and through which the materials are supplied to the cylinder; and
a discharge port which is provided in the barrel and through which kneaded materials generated by the extruder screw are continuously extruded.

15. An extrusion method of kneading the raw materials with the extruder screw of claim 1, and continuously generating and extruding the kneaded materials,
wherein
in the kneading portion, the raw materials conveyed along the outer circumferential surface of the screw main body flow through the path and then return to an outer circumferential surface of the extruder screw, while the kneaded materials are continuously extruded.

16. The extrusion method of claim 15, wherein
in the kneading portion,
the conveyance of the raw materials conveyed along the outer circumferential surface of the screw main body is limited by the barrier portion provided in the kneading section, and the pressure on the raw materials is thereby increased, and
the raw materials having the pressure increased flow into the path from the entrance.

17. The extrusion method of claim 16, wherein
in the kneading portion,
the raw materials flowing into the path from the entrance flow through the inside of the path in a same direction as a direction of the conveyance executed by the conveyance portion.

18. The extrusion method of claim 17, wherein
in the kneading portion,
the raw materials passing through the path flow out of the exit to the outer circumferential surface of the screw main body at a position displaced from the conveyance portion having the entrance opened.

* * * * *